United States Patent [19]
Stevers et al.

[11] Patent Number: 6,050,204
[45] Date of Patent: Apr. 18, 2000

[54] WASTE MATERIAL PROCESSING APPARATUS

[76] Inventors: Paul H. Stevers, 603 Gates La., Enola, Pa. 17025; Roger D. Eshleman, 506 Clayton Ave., Waynesboro, Pa. 17268; Earl H. Sigman, 3915 Carmel Forest Dr., Charlotte, N.C. 28226; John Kevin Pollard, 243 Leader Heights Rd., York, Pa. 17402

[21] Appl. No.: 09/076,856

[22] Filed: May 13, 1998

Related U.S. Application Data

[60] Provisional application No. 60/084,743, May 8, 1998.

[51] Int. Cl.[7] .................................. F23G 5/00; F23G 5/44
[52] U.S. Cl. ...................... 110/255; 110/229; 110/235; 110/259
[58] Field of Search .................................. 110/235, 242, 110/255, 259, 229, 210, 211

[56] References Cited

U.S. PATENT DOCUMENTS

| | | | |
|---|---|---|---|
| 411,963 | 10/1889 | Heavey | 110/242 |
| 945,041 | 1/1910 | Niles | 110/242 X |
| 3,330,230 | 7/1967 | Sasaki | 110/259 X |
| 4,080,909 | 3/1978 | Nalbandian et al. | 110/235 |
| 4,444,127 | 4/1984 | Spronz | 110/235 |
| 4,934,283 | 6/1990 | Kydd . | |
| 5,014,630 | 5/1991 | Looker | 110/235 X |
| 5,209,169 | 5/1993 | Basic, Sr. | 110/235 |
| 5,289,787 | 3/1994 | Eshleman . | |
| 5,323,716 | 6/1994 | Eshleman | 110/259 X |
| 5,338,144 | 8/1994 | Eshleman . | |
| 5,338,918 | 8/1994 | Eshleman . | |
| 5,353,719 | 10/1994 | Eshleman et al. . | |
| 5,361,709 | 11/1994 | Eshleman . | |
| 5,417,170 | 5/1995 | Eshleman . | |
| 5,420,394 | 5/1995 | Eshleman . | |
| 5,428,205 | 6/1995 | Eshleman . | |
| 5,501,159 | 3/1996 | Stevers et al. . | |

*Primary Examiner*—Ira S. Lazarus
*Assistant Examiner*—Ljiljana V. Ciric
*Attorney, Agent, or Firm*—Duane, Morris & Heckscher LLP

[57] ABSTRACT

A material processing apparatus includes a casing having a top and bottom and a plurality of sides defining a pyrolysis chamber for receiving and pyrolyzing feed materials therein into fluid materials and a mass of refractory material disposed upon the bottom of the casing and spaced below the top thereof and extending between its sides. The refractory mass includes an upper surface defining a bottom of the pyrolysis chamber and having an end spaced from a first one of the casing sides to define an ash residue collection cavity therebetween. The apparatus also includes a system of tunnels defined within the refractory mass being spaced below the upper surface thereof. The system of tunnels includes an inlet defined in the refractory mass at the end thereof and below the upper surface thereof and in communication with the cavity for receiving a flow of materials from the pyrolysis chamber into the system of tunnels and an outlet defined in a second one of the sides of the casing for discharging the flow of materials from the system of tunnels. The apparatus also includes elongated heater units mounted to sides of the casing and extending into and axially along selected ones of the tunnels in the system thereof.

19 Claims, 24 Drawing Sheets

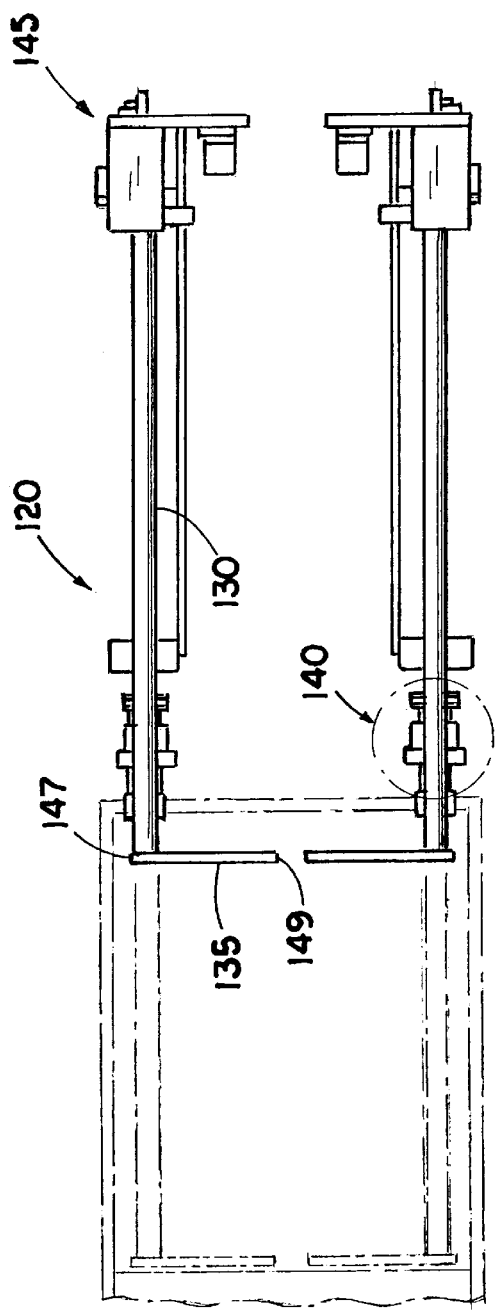
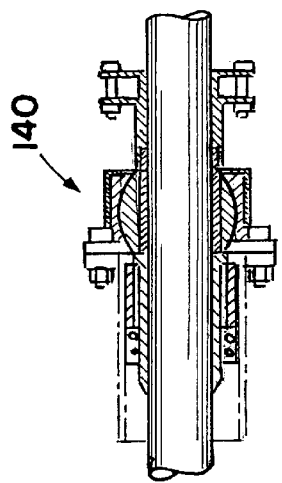
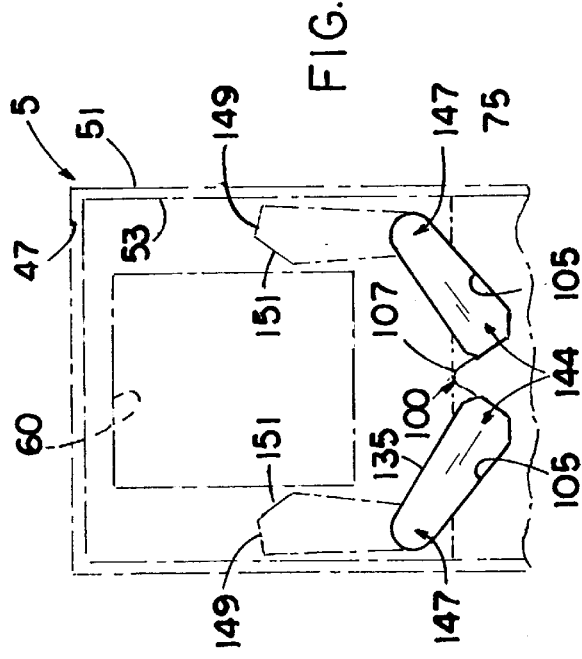
FIG. 14
FIG. 16
FIG. 15

WASTE MATERIAL PROCESSING APPARATUS

CROSS REFERENCE TO RELATED APPLICATION

This application claims the priority of copending Provisional Patent Application Ser. No. 60/084,743, filed May 8, 1998, entitled WASTE MATERIAL PROCESSING APPARATUS AND METHOD.

BACKGROUND OF THE INVENTION

1. Field of the Invention

The present invention generally relates to material processing and, more particularly, is concerned with an apparatus for controlled processing of materials and a method of controlling hydrocarbon release rate by maintaining target oxygen concentration in discharge gases so as to thereby convert successive batches of materials of widely varying energy content into substantially harmless gases and carbon-free residue ash, such as is necessary for the disposal of medical and other diverse waste material, particularly on-site where the waste material is produced.

2. Prior Art

The problem of disposal of waste matter involves a material processing challenge that is becoming increasingly acute. The primary material processing methods of waste disposal have been burning in incinerators and burial in landfills. These two material processing methods have severe disadvantages. Burning of waste liberates particulate matter and fumes which contribute to pollution of the air. Burial of wastes contributes to the contamination of ground water. A third material processing method is recycling of waste. Although increasing amounts of waste are being recycled, which alleviates the problems of the two primary material processing methods, presently available recycling methods do not provide a complete solution to the waste disposal problem.

The problem of disposal of biomedical waste materials is even more acute. The term "biomedical waste materials" is used herein in a generic sense to encompass all waste generated by medical hospitals, laboratories and clinics which may contain hazardous, toxic or infectious matter whose disposal is governed by more stringent regulations than those covering other waste. It was reported in *The Wall Street Journal* in 1989 that about 13,000 tons a day of biomedical waste, as much as 20% of it infectious, is generated by around 6,800 U.S. hospitals.

Hospitals and other generators of biomedical waste materials have employed three main material processing methods of waste handling and disposal: (1) on-site incineration with only the residue transferred to landfills; (2) on-site steam autoclaving and followed by later transfer of the waste to landfills; and (3) transfer of the waste by licensed hazardous waste haulers to off-site incinerators and landfills. Of these three main material processing methods, theoretically at least, on-site disposal is the preferred one.

However, many hospital incinerators, being predominantly located in urban areas, emit pollutants at a relatively high rate which adversely affect large populations of people. In the emissions of hospital incinerators, the Environmental Protection Agency (EPA) has identified harmful substances, including metals such as arsenic, cadmium and lead; dioxins and furans; organic compounds like ethylene, acid gases and carbon monoxide; and soot, viruses, and pathogens. Emissions of these incinerators may pose a public health threat as large as that from landfills.

Conventional incinerators most commonly are designed to operate above a certain temperature, such as 1200°–1400° F., to comply with requirements of the permit laws of many states. The reason for this requirement is that conventional thinking has been that operation of incinerators at such elevated temperatures will substantially eliminate the release of most harmful substances. This may have been true where the materials being consumed by the incinerator were assumed to be fairly uniform in terms of energy content and thus burned more or less evenly. However, this is the exception and not the normal situation today, particularly in the case of biomedical waste materials which can range from wet paper towels and steel surgery tools to plastic syringes and containers of saline solution. The thermal processing of these materials by temperature control alone will ordinarily result in the inability to control the hydrocarbon release rate and the repeated emission of un-burned hydrocarbons, typically visible as periodic puffs of black smoke, which is unacceptable under most current environmental regulations.

Nonetheless, on-site disposal of biomedical waste materials still remains the most promising solution. One recent on-site waste disposal unit which addresses this problem is disclosed in U.S. Pat. No. 4,934,283 to Kydd. This unit employs a lower pyrolyzing chamber and an upper oxidizing chamber separated by a movable plate. The waste material is deposited in the lower chamber where it is pyrolyzed in the absence of air and gives off a combustible vapor that, in turn, is oxidized in the upper chamber. While this unit represents a step in the right direction, it does not appear to approach an optimum solution to the problem of biomedical waste material disposal.

One problem with the approach of the aforementioned patent is that it proposes the use of an on-site waste disposal unit which is dedicated to the disposal of biomedical waste material. This approach requires that more than one incineration system be installed and maintained at hospitals, namely, one for biomedical waste and another for all other hospital waste. Resistance has been encountered to the adoption of this approach by hospitals due to added cost of installation, operation and maintenance. An urgent need has developed for an all-purpose material processing apparatus which can handle disposal of all types of hospital waste materials, both biomedical waste and general waste, such as metal needles and glass and plastic bottles.

Reference is also made to the following issued U.S. Patents dealing with subject matter related to the present invention, the disclosures of which are hereby incorporated in their entireties:

1. "Apparatus And Method For Controlled Processing Of Materials" by Roger D. Eshleman and Paul S. Stevers, assigned U.S. Ser. No. 07/987,928 and filed Dec. 9, 1992 and issued U.S. Pat. No. 5,353,719.
2. "Multiple Unit Material Processing Apparatus" by Roger D. Eshleman, assigned U.S. Ser. No. 07/987,929 and filed Dec. 9, 1992, and issued U.S. Pat. No. 5,289,787.
3. "Heat Generator Assembly In A Material Processing Apparatus" by Roger D. Eshleman, assigned U.S. Ser. No. 07/987,936 and filed Dec. 9, 1992, and issued U.S. Pat. No. 5,338,918.
4. "Casing And Heater Configuration In A Material Processing Apparatus" by Roger D. Eshleman, assigned U.S. Ser. No. 07/987,946 and filed Dec. 9, 1992, and issued U.S. Pat. No. 5,420,394.
5. "Apparatus And Method For Transferring Batched Materials" by Roger D. Eshleman, assigned U.S. Ser. No. 08/026,719 and filed Mar. 5, 1993, issued U.S. Pat. No. 5,338,144.

6. "Sloped-Bottom Pyrolysis Chamber And Solid Residue Collection System In A Material Processing Apparatus" by Roger D. Eshleman, assigned U.S. Ser. No. 08/299,034 and filed Sep. 17, 1993, issued U.S. Pat. No. 5,417,170.
7. "Material Transport Pusher Mechanism In A Material Processing Apparatus" by Roger D. Eshleman, assigned U.S. Ser. No. 08/123,747 and filed Sep. 17, 1993, issued U.S. Pat. No. 5,361,709.
8. "Improved Casing And Heater Configuration In A Material Processing Apparatus" by Roger D. Eshleman, assigned U.S. Ser. No. 08/123,454 and filed Sep. 17, 1993, issued U.S. Pat. No. 5,428,205.
9. "Method of controlling hydrocarbon release rate by maintaining target oxygen concentration in discharge gases" by Paul H. Stevers, assigned U.S. Ser. No. 08/283, 118 and filed Jul. 29, 1994, issued U.S. Pat. No. 5,501, 159.

SUMMARY OF THE INVENTION

The present invention provides a diverse material processing apparatus designed to satisfy the aforementioned needs. While the apparatus of the present invention can be used in different applications, it is primarily useful as an apparatus for waste disposal and particularly as an apparatus for disposing of biomedical and general hospital waste material on-site where the waste material is produced. A greater than 95% reduction in mass and volume is achieved as is the complete destruction of all viruses and bacteria. The residue is a sterile, inert inorganic powder, which is non-hazardous, non-leachable and capable of disposal as ordinary trash.

The preferred embodiment of the present invention includes various unique features for facilitating the processing of material and particularly the disposing of diverse waste material. Although some of these features may form a part of the inventions claimed in the patents cross-referenced above, these features are illustrated and described herein for facilitating a complete and thorough understanding of those features comprising the present invention.

Accordingly, the present invention is directed to a material processing apparatus which generally comprises: (a) a casing having a top, a bottom and a plurality of sides defining a pyrolysis chamber for receiving and pyrolyzing feed materials into fluid materials and including an upper portion for temporarily receiving the fluid materials and wherein at least one of the plurality of sides includes a down-draft duct having (i) an entrance positioned in flow communication with the upper portion of the pyrolysis chamber, and (ii) an exit spaced from the entrance; (b) a mass of refractory material contained in the casing and spaced below the top and extending between the sides, the refractory mass including an upper surface defining a bottom of the pyrolysis chamber and having an end being spaced from a first one of the sides of the casing so as to define an ash residue collection cavity; and (c) a system of tunnels defined within the refractory mass and spaced below the upper surface thereof, the system of tunnels including at least one inlet defined in the refractory mass adjacent to an end thereof and below the upper surface and in flow communication with the exit of the down-draft duct so as to receive a flow of the fluid material from the pyrolysis chamber into the system of tunnels and an outlet defined in a bottom of the casing for discharging the flow of materials from the system of tunnels.

In one preferred embodiment, the system of tunnels includes (a) a pair of spaced upper tunnels, each one of the pair of upper tunnels being disposed in flow communication with an inlet in a side of the refractory mass, (b) a lower tunnel, space below the pair of upper tunnels and arranged in transverse relation thereto and adjacent to an end of the refractory mass, (c) means for interconnecting the pair of upper tunnels in flow communication with the transverse lower tunnel, and (d) a middle tunnel arranged in open flow communication with the transverse lower tunnel and the outlet. The middle tunnel is adapted to form a hot gas trap.

In another preferred embodiment, means positioned adjacent to the upper surface of the refractory mass, are provided for selectively stirring the ash residue and at preselected times for removing ash residue from the upper surface. The means for stirring and removing comprise at least two degrees of freedom of movement. One exemplary structure includes a pair of blades that are each fixedly fastened to an end of a spaced pair of movable shafts. The blades and shafts comprise at least two degrees of freedom of movement, i.e., linear translation and angular rotation, so that the blades may be selectively positioned and oriented relative to the upper surface of the refractory mass for selectively stirring ash residue, and at preselected times, for removing the ash residue from the upper surface and into the ash collection cavity.

In a further preferred embodiment, the upper surface of the refractory mass includes an undulant contour such that at least a pair of elongate, concave surface depressions are separated by at least one elongate convex surface.

In yet another preferred embodiment, the ash residue collection cavity that is disposed at a bottom of the casing, beside a lower portion of the refractory mass, includes a bake-out trough and a cool-down trough. The bake-out trough and cool-down trough each comprise a concave upper surface defining a channel. These channels are arranged in longitudinal alignment with one another so as to form an elongate concave surface. The cool-down trough is disposed outwardly of the refractory mass at a bottom side of the casing so as to be positioned in a lower temperature portion of the casing. An outlet is defined at a distal end of the channel for discharging cooled ash residue into a receptacle. Means are positioned adjacent to an end of the concave surface of the bake-out trough and spaced from the cool-down trough for selectively stirring the ash residue that has collected therein, and at preselected times, for removing the ash residue from the bake-out trough to the cool-down trough and for pushing the ash residue into the discharge outlet. The means for stirring and removing comprise at least two degrees of freedom of movement. One exemplary structure includes a blade fixedly fastened to an end of a movable shaft. The blade and shaft comprise at least two degrees of freedom of movement, i.e., linear translation and angular rotation, so that the blade may be selectively linearly positioned and angularly oriented relative to the channel of the bake-out trough and spaced from the cool-down trough for selectively stirring the ash residue, At preselected times, the blade and shaft can be oriented and linearly advanced for removing the ash residue from the bake-out trough to the cool-down trough, and then into the discharge outlet.

The present invention also provides a method of controlling hydrocarbon release rate in thermal processing of materials which is designed to overcome the aforementioned problems of conventional incineration. The hydrocarbon release rate is controlled in a manner which converts successive batches of materials, particularly biomedical waste materials, of widely varying energy content into substantially harmless gases and carbon-free residue ash. The residue ash is a sterile, inert inorganic powder, which is non-hazardous, non-leachable and capable of disposal as ordinary trash.

Accordingly, the present invention is also directed to a method of controlling the hydrocarbon release rate in the thermal processing and conversion of materials of widely varying energy content in a batch processing cycle. The hydrocarbon release rate controlling method comprises the steps of: (a) providing a first chamber capable of receiving successive batches of feed materials for thermal processing and having widely varying energy content; (b) producing heating in the first chamber to cause pyrolyzing of the feed materials into fluid materials; (c) providing a second chamber communicating with the first chamber and capable of receiving the fluid materials from the first chamber and communicating the fluid materials to a discharge location; (d) producing heating in the second chamber to cause oxidizing of the fluid materials into discharge gases reaching the discharge location; (e) providing a jacketed vessel defining a channel surrounding the first and second chambers containing a flow of coolant fluid through the channel; (f) producing separate variable flows of primary and secondary air respectively into and through the first and second chambers; (g) sensing the temperatures in the first and second chambers; (h) sensing the temperature of the coolant in the channel of the jacketed vessel; (i) sensing the concentration of a preselected gas in the discharge gases; (j) in response to the temperatures sensed in the first and second chambers and jacketed vessel channel coolant and in response to the concentration of the preselected gas sensed in the discharge gases, controlling primary and secondary flows of air into the first and second chambers so as to proportion and vary the respective amounts thereof and thereby maintain concentration of the preselected gas in the discharge gases at a preset target corresponding to the generation of substantially harmless discharge gases and production of substantially carbon-free residue ash; and (k) in response to the temperatures sensed in the first and second chambers and in the jacketed vessel channel coolant and in response to the concentration of the preselected gas sensed in the discharge gases, selectively stirring an ash residue collected within said first chamber according to a predetermined pattern so as to thereby maintain the concentration of the preselected gas in the discharge gases at a preset target level corresponding with the generation of substantially harmless discharge gases and production of substantially carbon-free residue ash. The preselected gas is preferably oxygen.

The method also includes the step of mechanically stirring the ash residue collected in a bake-out trough located in an ash residue collection cavity within the first chamber. mass.

These and other features and advantages and attainments of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings wherein like numbers refer to like parts and further wherein:

FIG. 14 is a top elevational view of means for stirring and mixing ash residue disposed on the top surface of the refractory mass, showing a pair of shafts, a side on view of a pair of blades located within the pyrolysis chamber and a scraping device shown in a circled portion of the FIG. 16;

FIG. 15 is an end view, partially in phantom, of the blades of the stirring and mixing device illustrating extreme rotationally selected positions relative to the surface of the refractory mass;

FIG. 16 is a sectional view of the scraping device circled in FIG. 14;

DETAILED DESCRIPTION OF THE PREFERRED EMBODIMENTS

Figure 1:
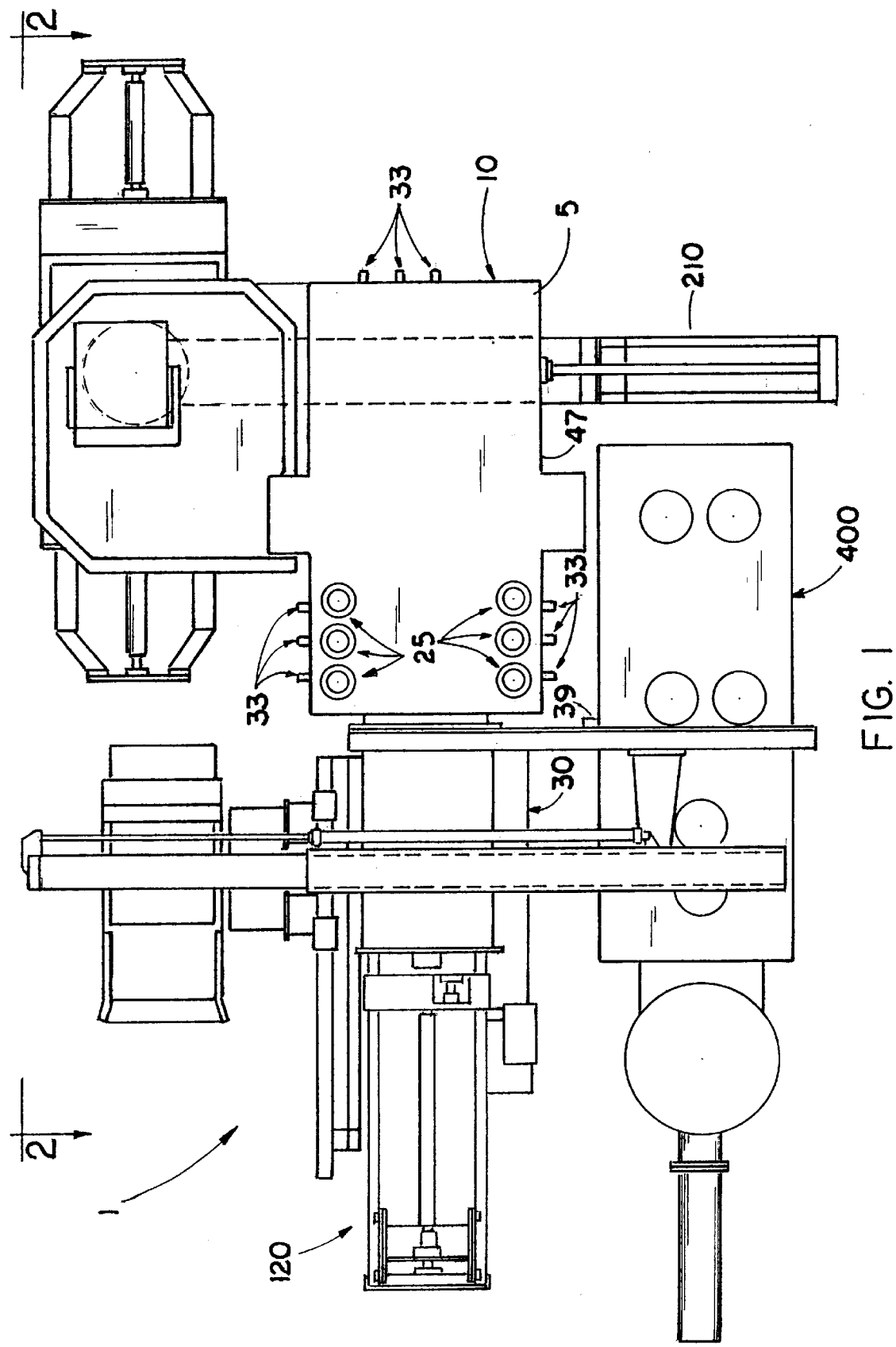
FIG. 1 is a plan top view of an apparatus for processing of a wide variety of diverse materials, particularly all types of biomedical and other waste materials generated by health care institutions, such as hospitals, formed in accordance with the present invention.
Figure 2:
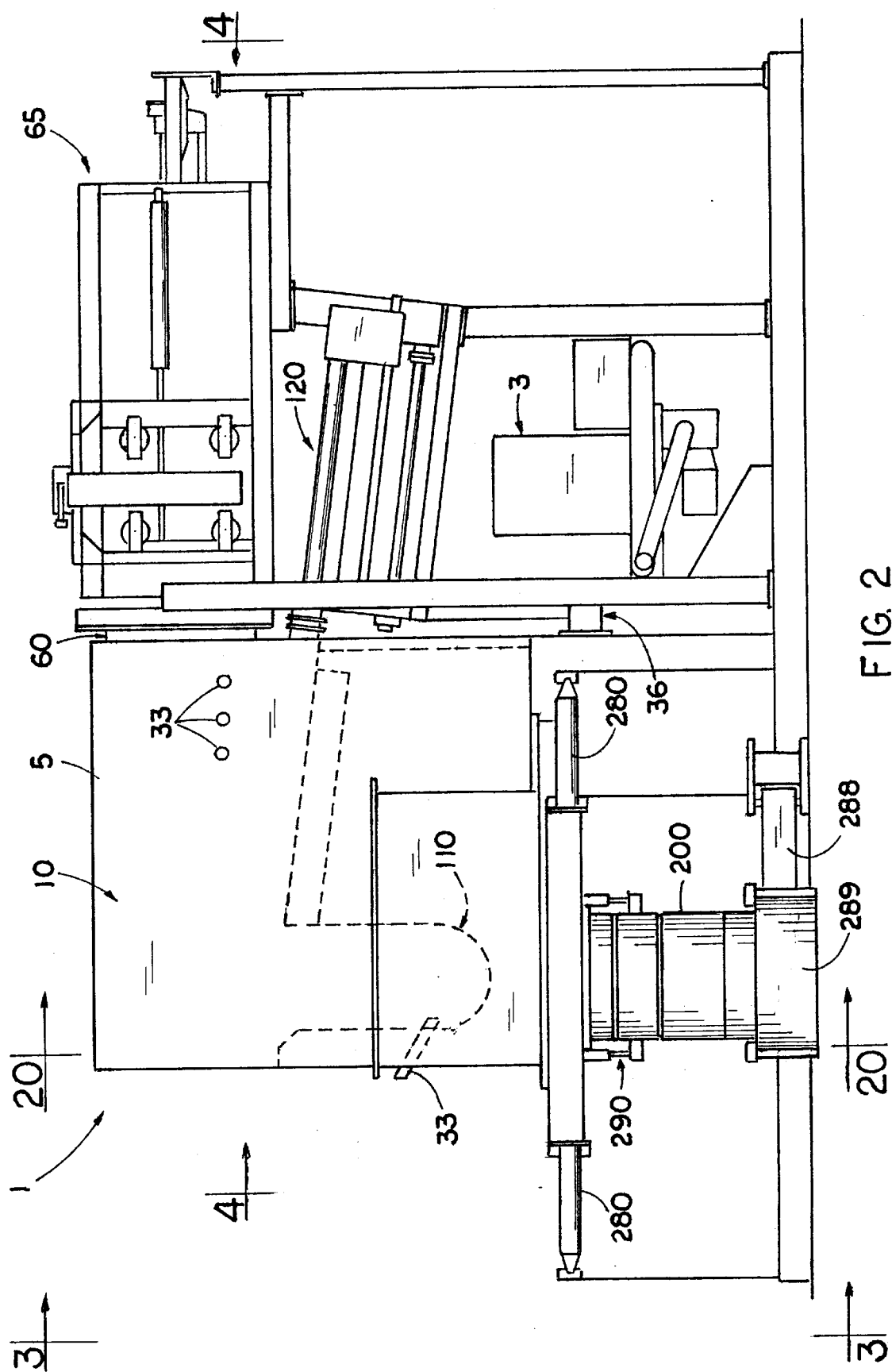
FIG. 2 is a side elevational view of the apparatus of FIG. 1 as seen from line 2—2 in FIG. 1.

In the following description, it is to be understood that such terms as "forward", "rearward", "left", "right", "upwardly", "downwardly", and the like, simply refer to the orientation of the structure of the invention as it is illustrated in the particular views shown in the drawings when the specific figure faces the reader. Similarly, the terms "inwardly" and "outwardly" generally refer to the orientation of a surface relative to its axis or elongation, or axis of rotation, as appropriate. Also, the terms "connected" and "interconnected", when used in this disclosure to describe the relationship between two or more structures, means that such structures are secured or attached to each other directly or indirectly through intervening structures, and includes pivotal connections. The term "operatively connected" means that the foregoing direct or indirect connection between structures allows such structures to operate as intended by virtue of such connection.

Referring now to the drawings, and particularly to FIGS. 1–4, there is illustrated an exemplary apparatus 1 for controlled thermal processing of waste materials 3, and in particular for controlled disposal of biomedical waste materials, which is operated in accordance with a hydrocarbon release rate controlling method. Material processing apparatus 1 basically includes a coolant jacketed vessel 5 defining at least a first pyrolysis chamber 10. A second, oxidation chamber and main heat exchanger 400 are also enclosed by coolant jacketed vessel 5, and are more fully disclosed in the foregoing cross-referenced patents. The apparatus also includes one or more first heater units 25 having a plurality of elongated rod-like electric heating elements mounted in the vessel and being operable to electrically generate heat for pyrolyzing materials in first chamber 10, and one or more second heater units 27 having a plurality of electric heating elements mounted in the vessel and being operable to electrically generate heat materials in second chamber 20.

The apparatus further includes an air flow generating means, preferably an induction fan and a fan speed controller (indicated generally at 30), connected in flow communication with first chamber 10 and second chamber 20, and first and second airflow inlet valves 33, 36 connected to jacketed vessel 5. The apparatus also includes an air intake proportioning valve (not shown) connected in flow communication with the first and second air inlet valves. Induction fan 30, the proportioning valve, and first and second inlet valves 33, 36 function to produce separate primary and secondary variable flows of air respectively into and through first chamber 10 and second chamber 20. One suitable embodiment of the fan speed controller is a commercially-available unit identified as GPD 503 marketed by Magnetek of New Berlin, Wis. One suitable embodiment of the valves is disclosed in U.S. Pat. No. 4,635,899, the disclosure of which is incorporated herein by reference. One suitable embodiment of the proportioning valve is a pair of conventional air intake butterfly valves controlled by a standard proportioning motor marketed by the Honeywell Corporation. The respective amounts of air in the primary and secondary flows drawn through the first and second chambers by operation of the induction fan are proportioned by the operation of the proportioning valve to separately adjust the ratio of the amounts of air flow routed to the first and second air inlet valves 33, 36. The respective amounts of air drawn in the primary and secondary flows are correspondingly varied by varying the speed of operation of the induction fan.

At least three temperature sensors 37, 38, 39 (FIG. 33) such as conventional thermocouples, are mounted on vessel 5 for sensing temperatures in first chamber 10 and second chamber 20, and in the coolant circulating about a channel 40 (FIG. 4) defined by jacketed vessel 5 about first chamber 10 and second chamber 20. Additionally, a gas sensor 42 (FIG. 33) is mounted on a discharge outlet of vessel 5 for sensing the concentration of a predetermined gas, for example oxygen, in the discharge gases. Also, a computer-based central control system 44 (FIG. 33) is incorporated in the apparatus for controlling and directing the overall operation of the apparatus in accordance with a hydrocarbon release rate controlling method. One suitable computer which can be employed by the control system is a PC-55 marketed by the Westinghouse Electric Corporation of Pittsburgh, Pa.

For many applications, material processing apparatus 1 can be provided in the form of a single unit where all components of the apparatus are contained within the one unit. However, in order to accommodate space and installation requirements, there are other applications where material processing apparatus 1 needs to be provided in the form of two separate first and second units. Still referring to FIGS. 1–4, material processing apparatus 1 includes a casing 47 having an outer wall 51 and an inner wall 53 disposed in spaced, confronting relation to one another, thus forming a coolant jacketed, airtight pressure vessel 5 inside of inner wall 53, with channel 40 defined between outer and inner walls 51, 53. Channel 40 surrounds vessel 5 and contains a flow of coolant fluid, such as water. The above-identified related patents show examples of the circulation flow path of coolant fluid about similar vessel channels. As mentioned above, vessel 5 is separated into first and second units and has means in the form of a pair of tubular extensions of the outer and inner walls which are fastened together to interconnect the first and second units in flow communication with one another.

Figure 5:
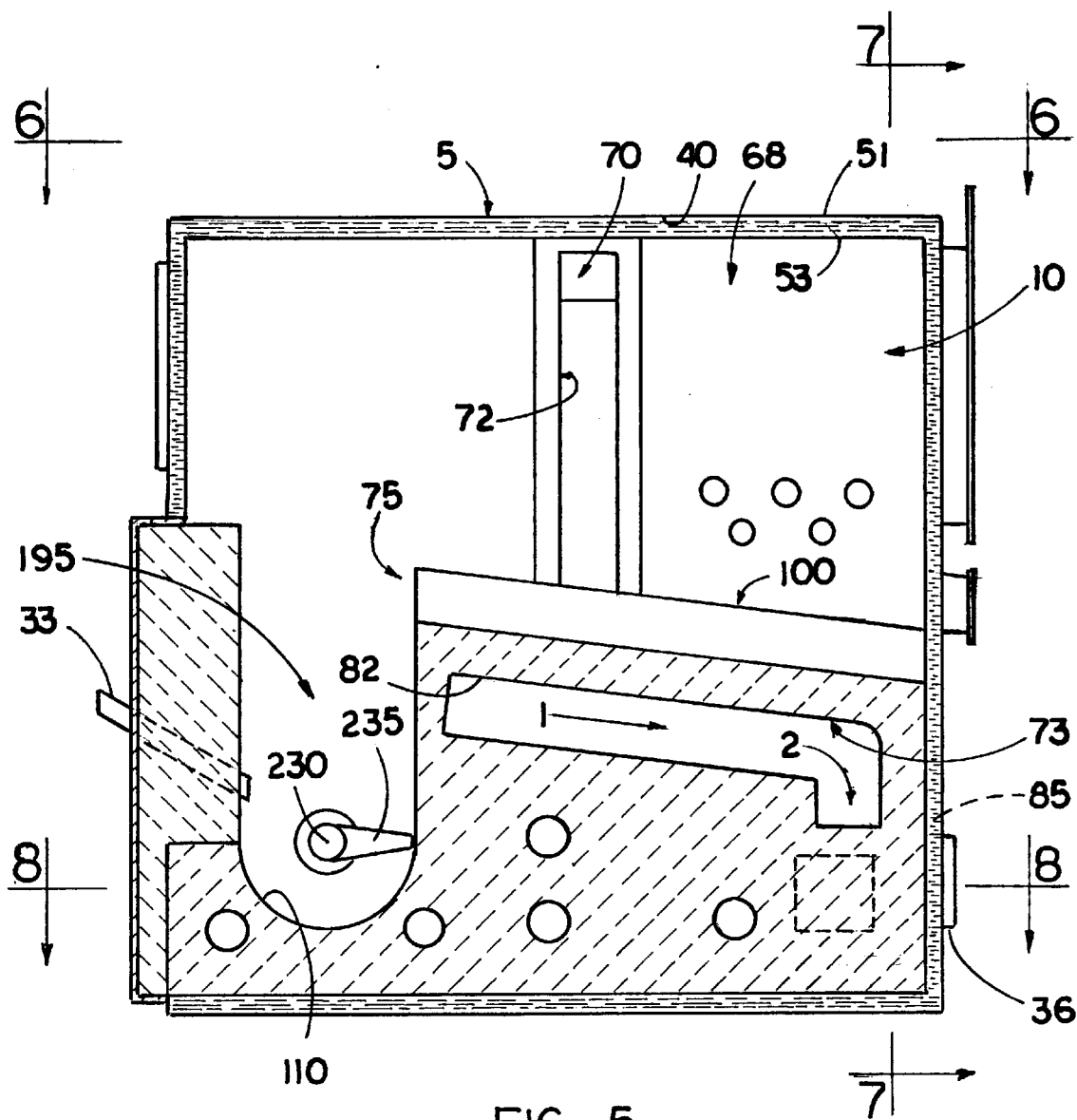
FIG. 5 is a first longitudinal, vertical sectional view, as taken along lines 5—5 in FIG. 4, of a preferred pyrolysis chamber and refractory mass.
Figure 6:
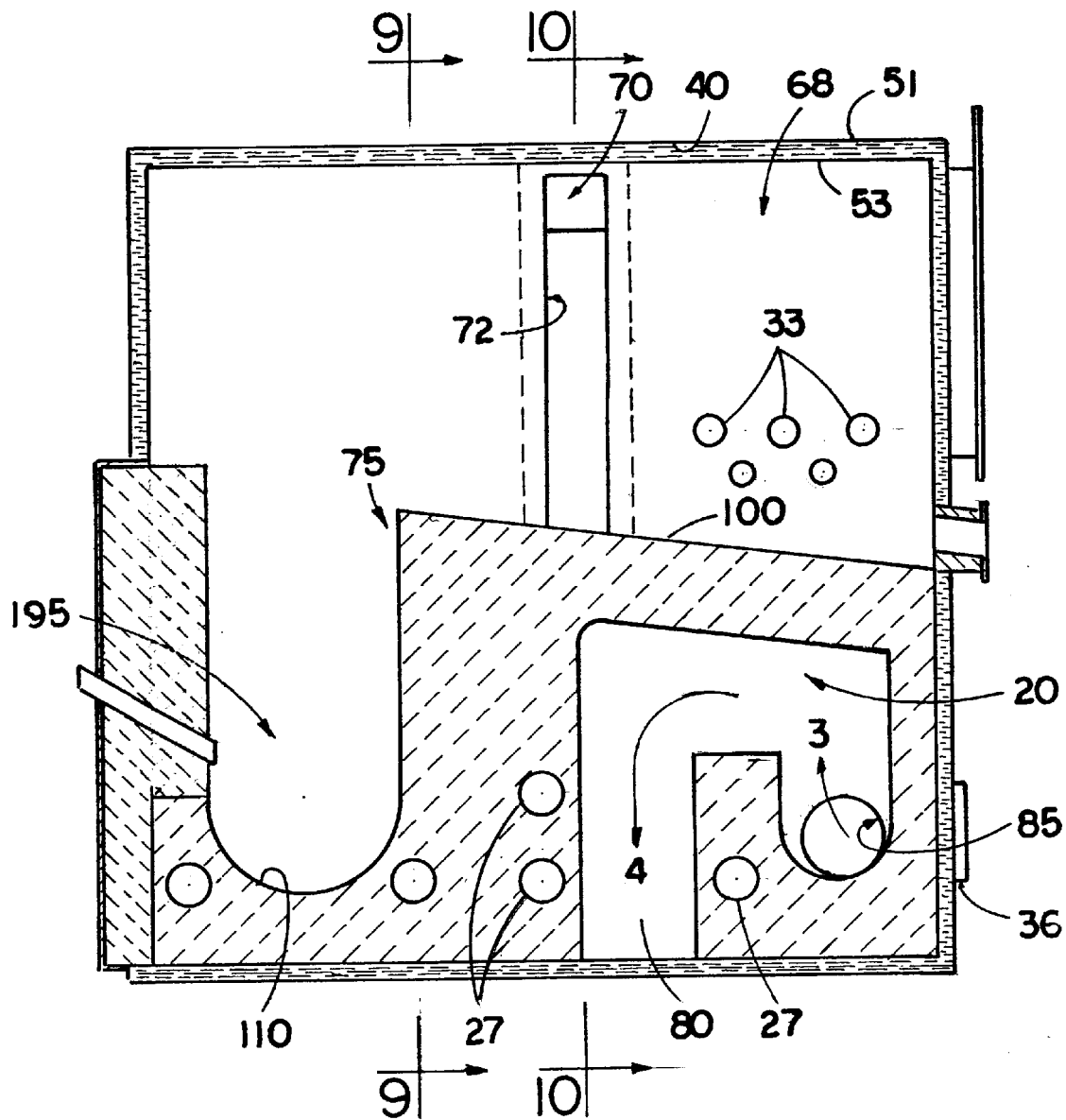
FIG. 6 is a second vertical sectional view, as taken along lines 6—6 in FIG. 5, of the preferred pyrolysis chamber and refractory mass shown in FIG. 5 showing a middle tunnel and chamber.
Figure 7:
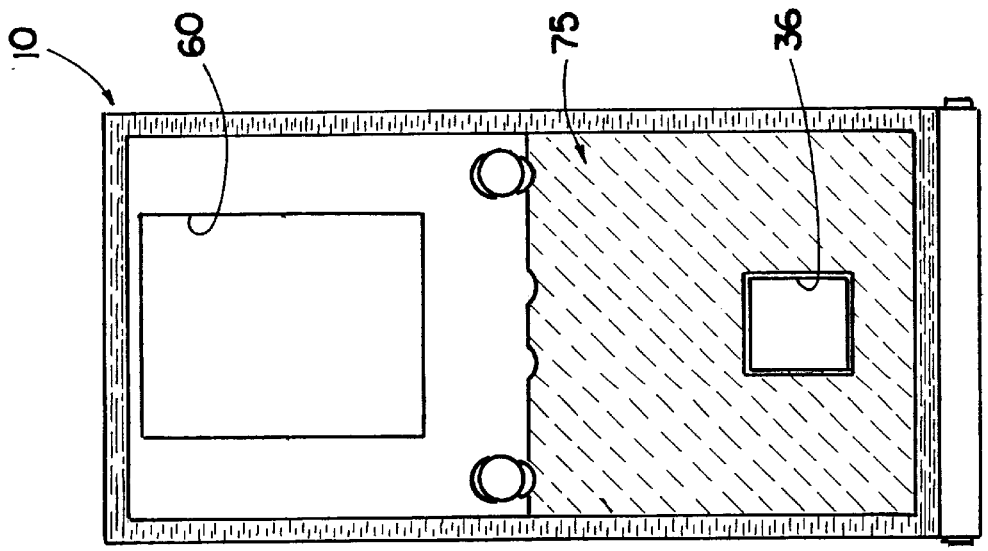
FIG. 7 is a transverse view of the preferred pyrolysis chamber and refractory mass shown in FIG. 5, as taken along lines 7—7 in FIG. 5, as taken along lines 8—8 in FIG. 5.
Figure 8:
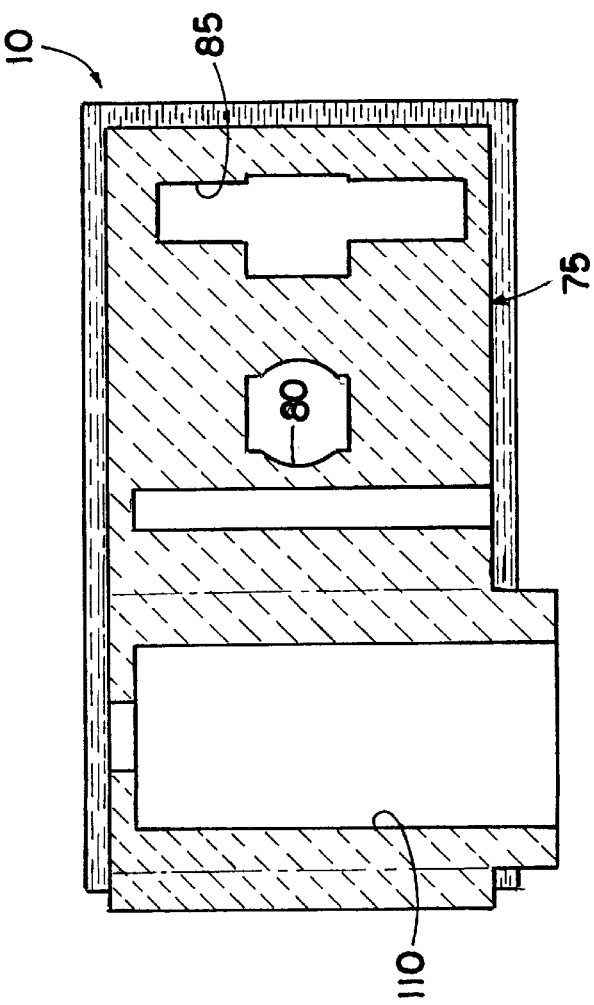
FIG. 8 is a horizontal transverse cross-section view of the refractory mass shown in FIG. 5, as taken along lines 8—8 in FIG. 5.
Figure 10:
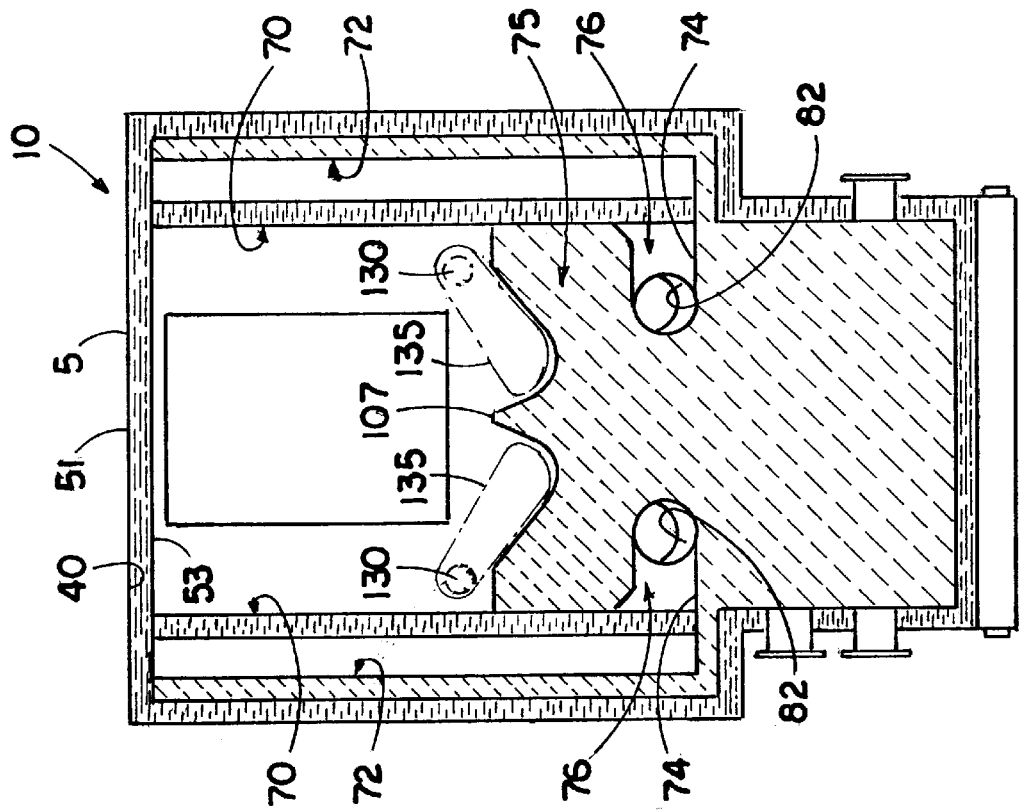
FIG. 10 is a cross-sectional view, as taken along lines 10—10 in FIG. 6, and similar to FIG. 9, but also including a phantom view of the blades of the stirring and mixing means positioned in channels formed in the surface of the refractory mass that resemble a "W" shape and also showing conduits communicating between an upper portion of the pyrolysis chamber and the pair of upper tunnels in the refractory mass.
Figure 9:
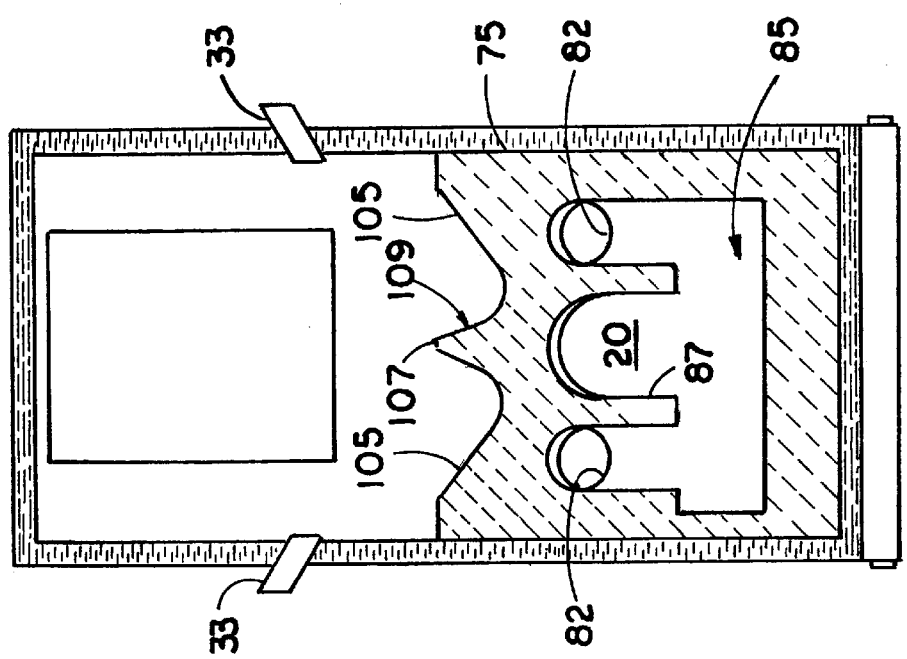
FIG. 9 is a cross-sectional view of the preferred pyrolysis chamber and refractory mass shown in FIG. 6, as taken along lines 9—9 in FIG. 6, further showing the surface contour of the refractory mass, the transverse lower tunnel, and the middle tunnel.

Referring to FIGS. 4–10, vessel 5 defines first pyrolysis chamber 10 having an inlet 60 and second oxidation chamber 20 connected in communication with first pyrolysis chamber 10 and having a discharge outlet 80. First chamber 10, in which waste materials 3 will be pyrolyzed, receives materials through inlet 60, via operation of an automatic feeding system 65. Material 3, through pyrolysis, or burning in a starved oxygen atmosphere, is converted to a gas that tends to congregate in an upper portion 68 of first chamber 10. This gas exits first chamber 10 by passing into an entrance 70 disposed in inner walls 53, and flows through a down-draft duct or conduit 72 into and through a system of tunnels 73 formed in a refractory mass 75 (FIGS. 5 and 6). It should be understood that in some of the various cross-sectional views of apparatus 1, only one down-draft duct or conduit 72 can be seen, however, a preferred embodiment of the invention will comprise two such down-draft ducts 72 disposed in confronting relation to one another in opposing portions of inner wall 53 and outer wall 51, so that a down-draft duct or conduit 72 will be positioned on each side of refractory mass 75 (see FIG. 10). Second chamber 20 receives the pyrolyzed materials from first chamber 10 and, after oxidizing the pyrolyzed materials therein, discharges the oxidized materials therefrom through discharge outlet 80.

Referring to FIGS. 5–10, a series of passages or tunnels 73 are defined in mass of refractory material 75. As the pyrolyzed gas flows down through each down-draft duct or conduit 72 from upper portion 68 of pyrolysis chamber 10, it enters a respective upper tunnel 82, defined in refractory mass 75. The gas enters refractory mass 75 through an inlet opening 74 defined in each side of refractory mass 75, adjacent to an exit opening 76 (FIG. 10) of one of the down-draft ducts or conduits 72. The gas passes through each upper tunnel 82 toward a transverse lower tunnel 85. The gas then flows toward the middle of refractory mass 75 until it enters a middle tunnel 87 that forms an inner trap or chamber 20. Chamber 20 typically houses gas at a temperature of from about 2,000° F. to about 2,200° F., whereas primary chamber 10 contains gases at a temperature of from 300° F. to 600° F. The hot gas then flows toward discharge opening 80 where the oxidized gas passes down to a lower tunnel, where further turbulence is generated by a series of vertically oriented rods disposed within opening 80, after which the gas flows to the second unit.

The series or arrangement of tunnels 73 formed in refractory mass 75 define the primary section of chamber 20, and provide communication with the first chamber 10, via down-draft ducts or conduits 72, disposed within the side walls of chamber 10. Refractory mass 75 is, of course, surrounded by jacketed vessel 5 and maintained in a heated condition at elevated temperatures by the heating produced in the first chamber by the first heater units 25 and by the pyrolyzing and oxidizing of materials 3.

Middle tunnel 87 defines chamber 20 where hot gas (2,000–2,200° F.) from in the lower section of refractory mass 75 is trapped, and prevented from flowing back up into pyrolysis chamber 10. Hot gas from chamber 20 could explode, under certain conditions, if it were to mix with the higher oxygen content, lower temperature gasses located in upper portion 68 of pyrolysis chamber 10. For example, if there is a rapid shut down of apparatus 1 (e.g., a power outage) where the induction fan is turned off, then, after a while, gasses in the pyrolysis chamber cool down due to the cooling effect of the water flowing in channel 40 of vessel 5. In this situation, the lower, hotter gas located in chamber 20 of refractory mass 75 would normally tend to flow upwardly, and could mix with oxygen in chamber 10. It being understood that the lower, hotter gas in chamber 10 is oxygen depleted, whereas the upper cooler gas is, relatively, oxygen rich. However, the trap created by chamber 20 of middle tunnel 87 prevents hot gases from moving back up through down-draft ducts or conduits 72, due to the difference in density between the gasses in upper portion 68 and chamber 20, among other factors. As a result, the lower, hotter gas will tend to remain trapped in chamber 20 of middle tunnel 87, and not move back up through down-draft ducts or conduits 72 and into pyrolysis chamber 10.

Refractory mass 75 also includes an upper exterior surface 100 which is exposed to first chamber 10 and below which resides system of tunnels 73. Upper surface 100 comprises an undulant contour that, in transverse cross-section (FIGS. 9, 10, 11, 17 and 20), resembles a letter "W" in shape. As viewed in FIG. 11, upper surface 100 comprises a pair of elongate, concave surface depressions (gullies) 105 separated by one elongate convex surface (rib) 107. Upper surface 100 is preferably coated with a refractory grade surface coating 109. The undulant contour of upper surface 100 provides for greater surface area to be in contact with waste material 3, thereby transferring greater heat to these materials. Also, upper surface 100 is inclined at about 8°–10° slope so that it slopes downwardly, toward the wall of vessel 5 through which material 3 is introduced into chamber 10. The inclined arrangement prevents low caloric content waste materials, e.g., liquid water, from spilling off of upper surface 100 and into bake-out trough 110.

The undulant surface contour of upper surface 100 also helps to position newly introduced materials 3 (typically in the form of a sealed paper board container or box housing medical waste or the like) above the ash residue (not shown) that has been formed from pyrolyzing previously introduced waste material and thereby allowing for more even and thorough pyrolyzation of the newly introduced waste material. In particular, the undulant contour of upper surface 100 prevents the newly introduced material 3 from mixing with lower temperature water that may be resident in gullies 105. In this arrangement, a box containing waste material 3 is placed in first chamber 10 through inlet 60. The box falls into first chamber 10 and onto rib 107, where it is prevented from completely engaging the ash residue and water that may be collecting in gullies 105. This arrangement also helps to maintain at least some direct contact between upper surface 100 of refractory mass 75 and the newly introduced waste material.

The heated condition of refractory mass 75 causes heating and pyrolyzing of materials 3 which come in close proximity to upper surface 100. By the provision of the refractory mass, and maintenance of its heated condition at elevated temperatures, the waste material in first chamber 10 which comes in close proximity to or contact with the upper surface 100 (via contact with at least rib 107) is being continuously heated from underneath by the refractory mass. This construction increases pyrolyzation of difficult to pyrolyze materials present in the first chamber, and contributes to the substantially complete conversion thereof to a carbon-free ash residue.

The heating effect at upper surface 100 is enhanced by the use of stirring and mixing means 120 (FIGS. 13–19) which, according to a stirring sequence or "recipe" defined by the overall condition of the residue mass (e.g., the sensed temperature, hydrocarbon content, etc.) allows for the nearly complete conversion of the waste material. One possible form of stirring and mixing means 120, that is contemplated for use in the present invention, is an extendable, rotatable blade assembly 125 (ERB assembly 125). Each ERB assembly 125 comprises a shaft 130, a stirring blade 135, a shaft scraper 140, and means 145 for moving shaft 130 and stirring blade 135. More particularly, each shaft 130 includes a conventional cooling system 133 (FIG. 18) located along its length and adapted to maintain shaft 130 at a lower temperature than that of chamber 10. In one embodiment, shaft 130 has air circulated through its interior to maintain its temperature within specified limits. Shafts 130 are arranged so that they pass through inner and outer walls 53, 51, in substantially parallel relation to one another, and below inlet 60. In this way, the portion of shafts 130 located at any given time within chamber 10, are positioned in spaced, overlying relation to gullies 105 of upper surface 100 of refractory mass 75. Shaft scrapers 140 provide a thermally sealed and gas tight interface in walls 51, 53, through which shafts 130 may pass into chamber 10. Shaft scrapers 140 also help to remove any debris, e.g., ash residue, that may collect on the outer surface of shafts 130 while they are resident in chamber 10.

Referring to FIG. 15, stirring blades 135 preferably comprise paddle shaped plates of high temperature metal or ceramic, having a first end 147 that is adapted to be fixed to an end of a shaft 130 and a second end 149 that is somewhat rounded so as to complement the surface contour of gullies 105. As shown in FIG. 15, second end 149 may include a flattened corner portion 151 that complements a flatten bottom surface of each gully 105.

Means 145 for moving shafts 130 and stirring blades 135 may comprise any electromechanical or hydraulic or pneumatic device of a type known for moving supported shaft type structures, as long as means 145 is capable of imparting two degrees of freedom of movement to shafts 130 and stirring blades 135, i.e., means 145 must be capable of moving the shafts linearly, into and out of chamber 10, while at the same time imparting selective rotational motive force to the shafts so that stirring blades 135 are selectively rotated into and out of gullies 105 of upper surface 100.

For example, a ball screw 155 (FIG. 17) or hydraulic cylinder (not shown) may be used to actuate ERB assembly 125. Each ERB assembly 125 is operated separately, and independently of the other according to a set program, library of routines or recipes in response to sensor data on hydrocarbon and gas concentration, gas flow, and temperature. If a preselected change in the range of any of these, or other parameters, is sensed, then ERB assembly 125 (also called stirrers) is activated to stir the ash residue by a preselected series of linear and rotational movements. For thorough combustion or pyrolysis, ash material must be stirred periodically and spread out over upper surface 100. When pyrolysis has neared an end, or finished, shafts 130 are fully extended by means 145, from the end of upper surface 100 closest to inner wall 53 of vessel 5, with stirring blades 135 rotated so that flattened corner portions 151 are placed into full engagement with the bottom surface of each gully 105, and the collected ash residue is pushed off, over the end of refractory mass 75 and into bake-out trough 110.

If only a single degree of freedom push arm or lever is used to push ash residue off upper surface 100, metal objects may be caught between upper surface 100 and blade 135. This condition would either break the blade or jam it, or bind it, or cause the obstructing object to dig into the surface coating. With the present invention, if ERB assembly 125 is in a pushing mode and a jam is sensed, then by merely rotating the shaft upwardly, a little, to get over the obstruction, the jam can be cleared. Also, by rotating each blade 135 according to a preset recipe, different amounts of material may be stirred, as needed. Further, blade 135 must be rotated completely out of the way when a new box of waste material 3 is dropped through inlet 60 onto upper surface 100. Of course, it will be understood that a single blade and shaft structure may also be used without departing from the present invention, as an equivalent structure to a pair of blades and shafts, as long as they can move in two directions, i.e., linearly and rotatable. Likewise, more than two blades and shafts may also provide means for stirring and mixing the ash residue. By stirring the ash residue with ERB assembly 125, it is possible to separate newly introduced waste material from prior, already pyrolyzed waste material.

Figure 17:
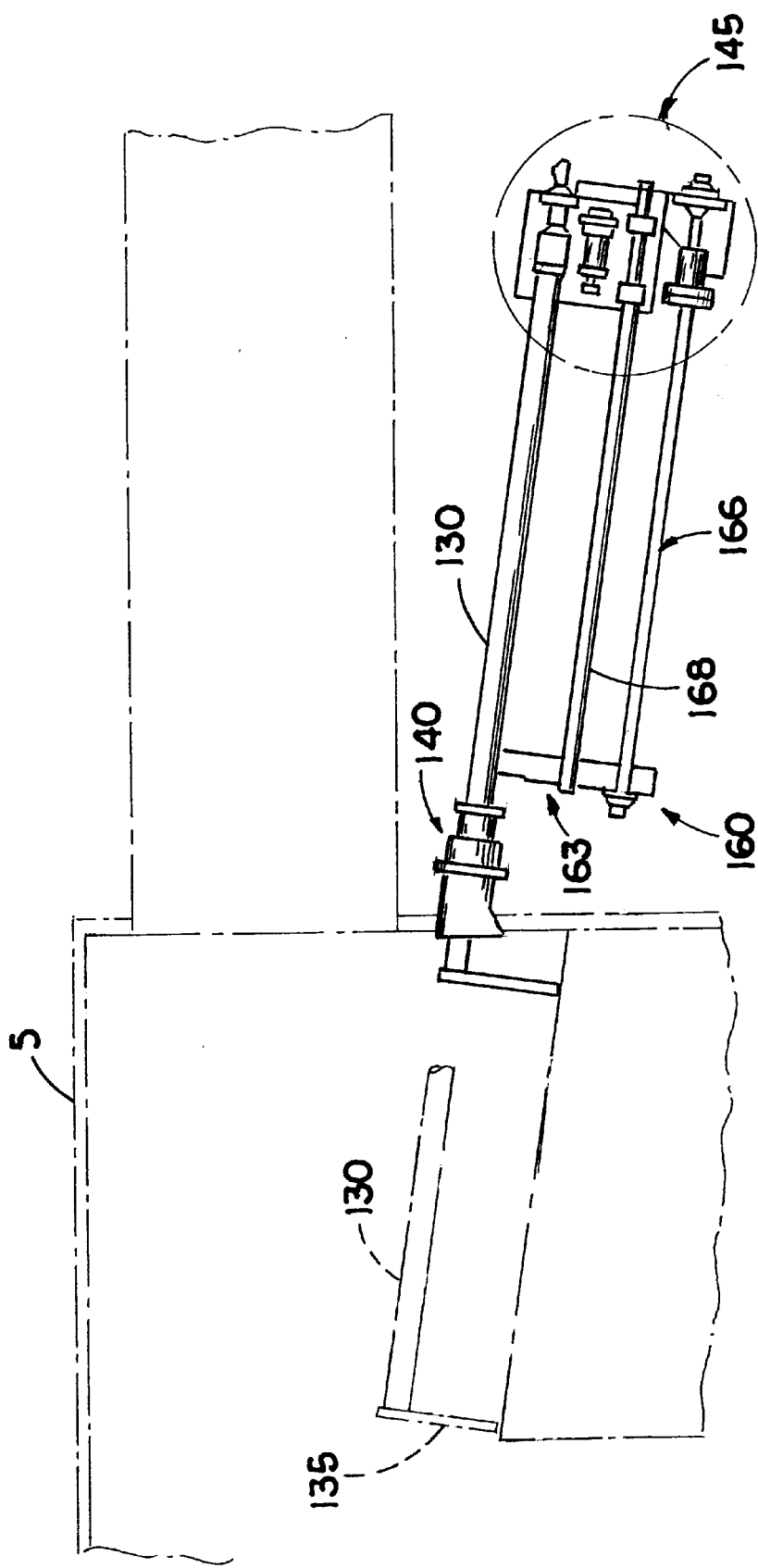
FIG. 17 is a broken-away view of a ball-screw adapted for telescopically moving the shafts of the stirring and mixing device within the pyrolysis chamber.
Figure 18:
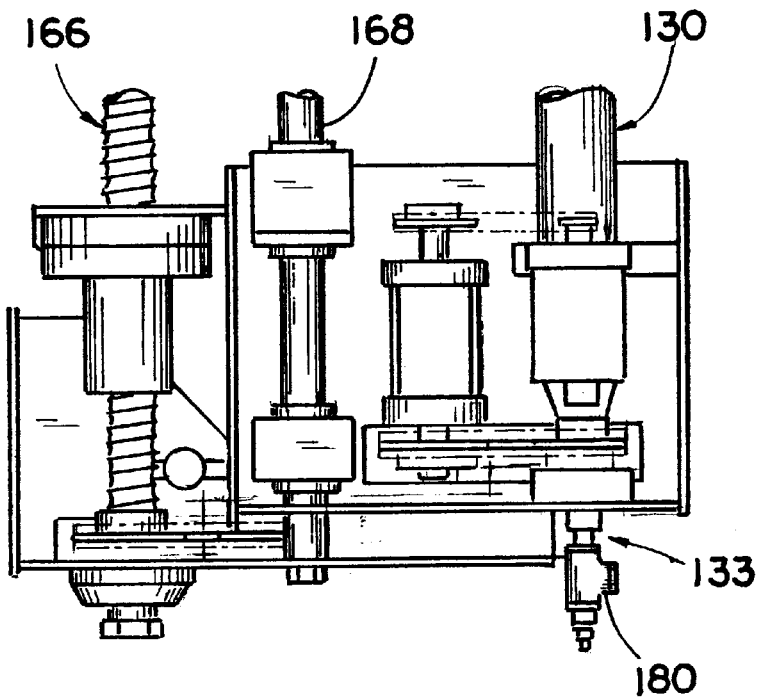
FIG. 18 is an enlarged top elevational view of a portion of the motive means shown in FIGS. 17 and 19.
Figure 19:
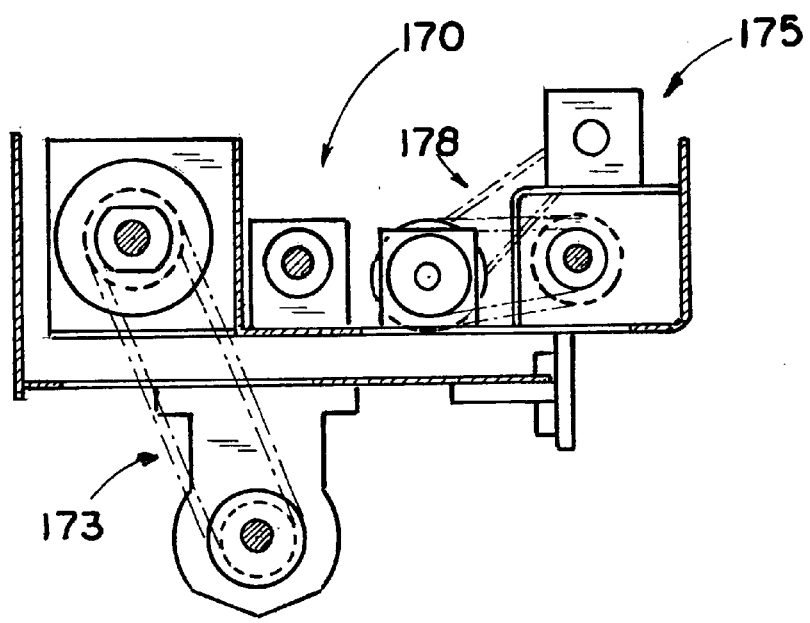
FIG. 19 is an elevational view of a motive power source used for providing rotational and translational motive force to the stirring and mixing device.

As shown in FIGS. 17–19, one possible means for moving ERB assembly 125 comprise a ball nut 160 attached on a bracket 163 to support one end of shaft 130. Ball nut 160 moves on ball screw 166 and a guide rod 168 guides the shaft and blade structure as it moves in and out of chamber 10. A hydraulic motor 170 with a belt, or chain and pulley 173 for rotating ball screw 166 may be used to move shaft 130 linearly, in and out, of chamber 10. Another hydraulic motor 175 with a belt or chain pulley 178 may be used to rotate shaft 130, and thus blade 135 within chamber 10. A conventional shaft encoder, or other known sensor is used to record the angular position of blade 135 relative to the center of shaft 130 and upper surface 100. As shown in FIG. 18, cooling system 133 comprises a system of ducts running the length of shaft 133 and being adapted to circulate coolant introduced through coolant port 180, located at a proximal end of shaft 130.

Figure 11:
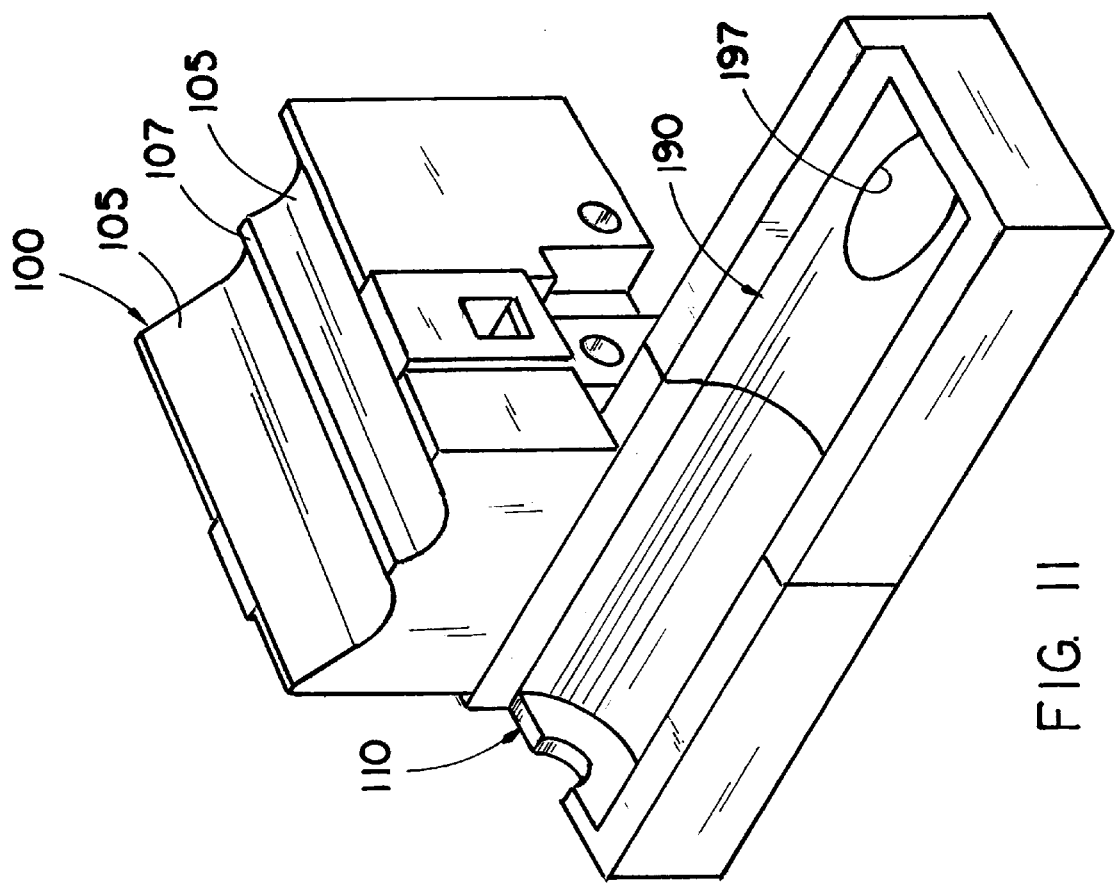
FIG. 11 is a broken-away, perspective view of the preferred refractory mass showing a portion of the "W" shaped surface and front bake-out and cool-down troughs.
Figure 12:
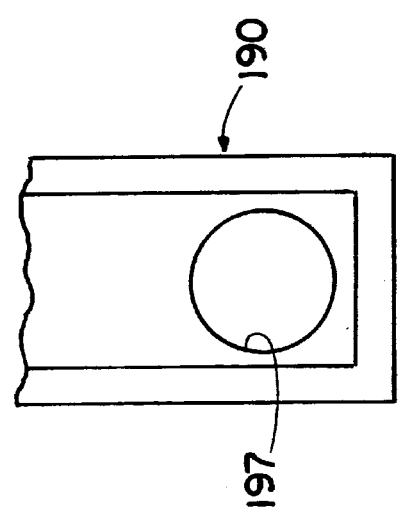
FIG. 12 is a broken-away, sectional view of the cool-down trough.
Figure 13:
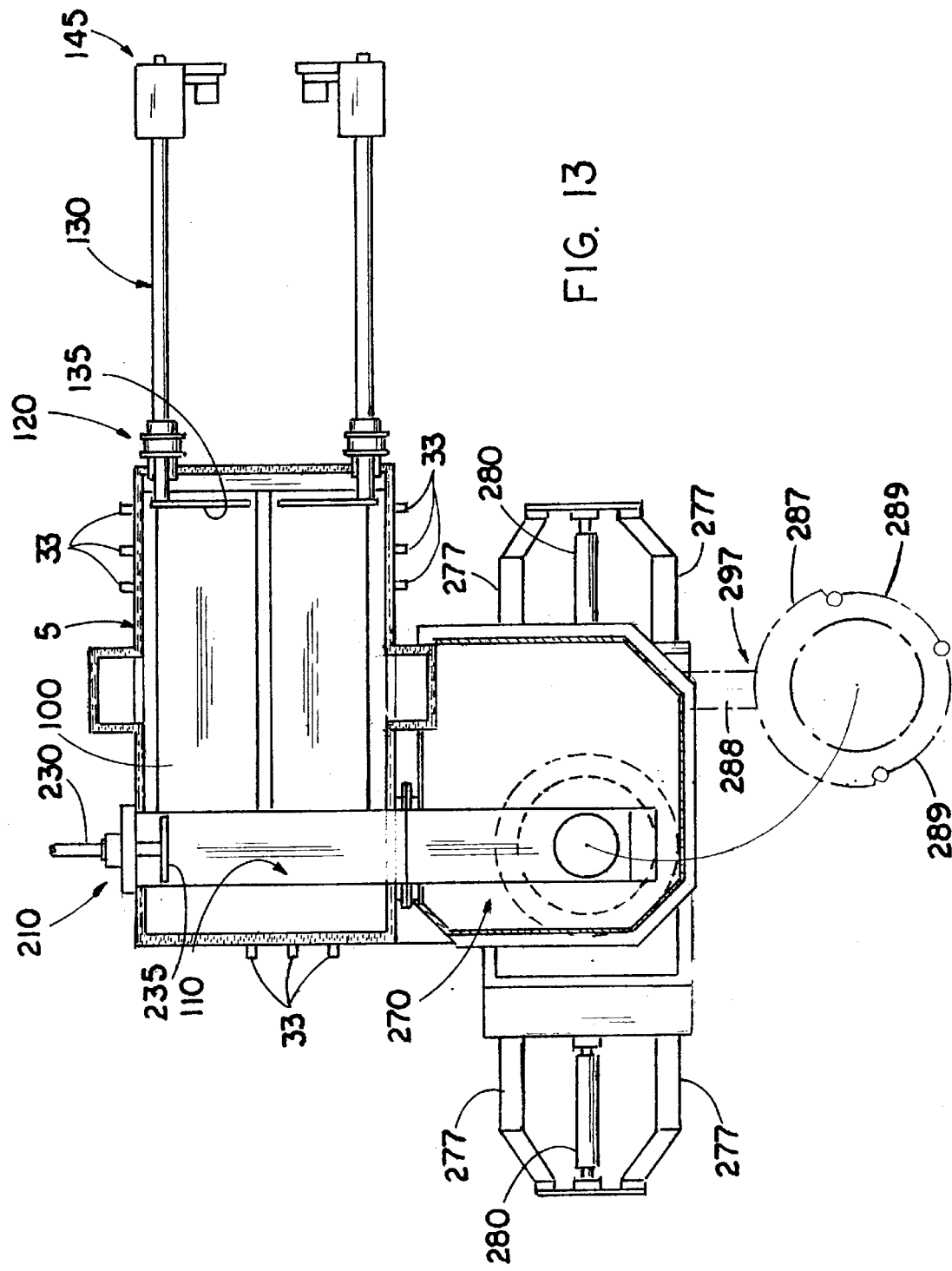
FIG. 13 is a top plan view of the pyrolysis chamber, showing a pair of extendable, rotatable blade assemblies and a top view of a residue collection portion of the invention.

The present invention utilizes three stages of processing. First, the primary pyrolysis of waste material 3 is carried out by placing the waste material onto upper surface 100 of refractory mass 75. About 85% of the volume of waste material 3 is removed at this stage. Then, the ash residue is swept off of upper surface 100 of refractory mass 75 by stirring and mixing means 120, e.g., by ERB assembly 125, and into bake-out trough 110 where further primary air is added to the ash, via primary air valves 33, so that oxidation rather than pyrolysis, takes place to get rid of the rest of the hydrocarbons that are present in the ash residue. About a 10–15% further reduction in volume of material is accomplished at this stage. This ash material then is moved to a cool-down trough 190 where it cools. At this stage, only about 5% of the volume of original waste material is left. Once cooled, the remaining ash residue is pushed into a barrel 200 for disposal. Bake-out trough 110 and cool-down trough 190 are best seen in FIGS. 11 and 12, and comprise an elongate, relatively narrow concave channel positioned at the bottom of an ash residue collection cavity 195 defined between refractory mass 75 and the wall of vessel 5 (FIGS. 5 and 6). Cool-down trough 190 further includes a bore 197, defined in the bottom of the channel, that communicates with a residue barrel 200.

Figure 3:
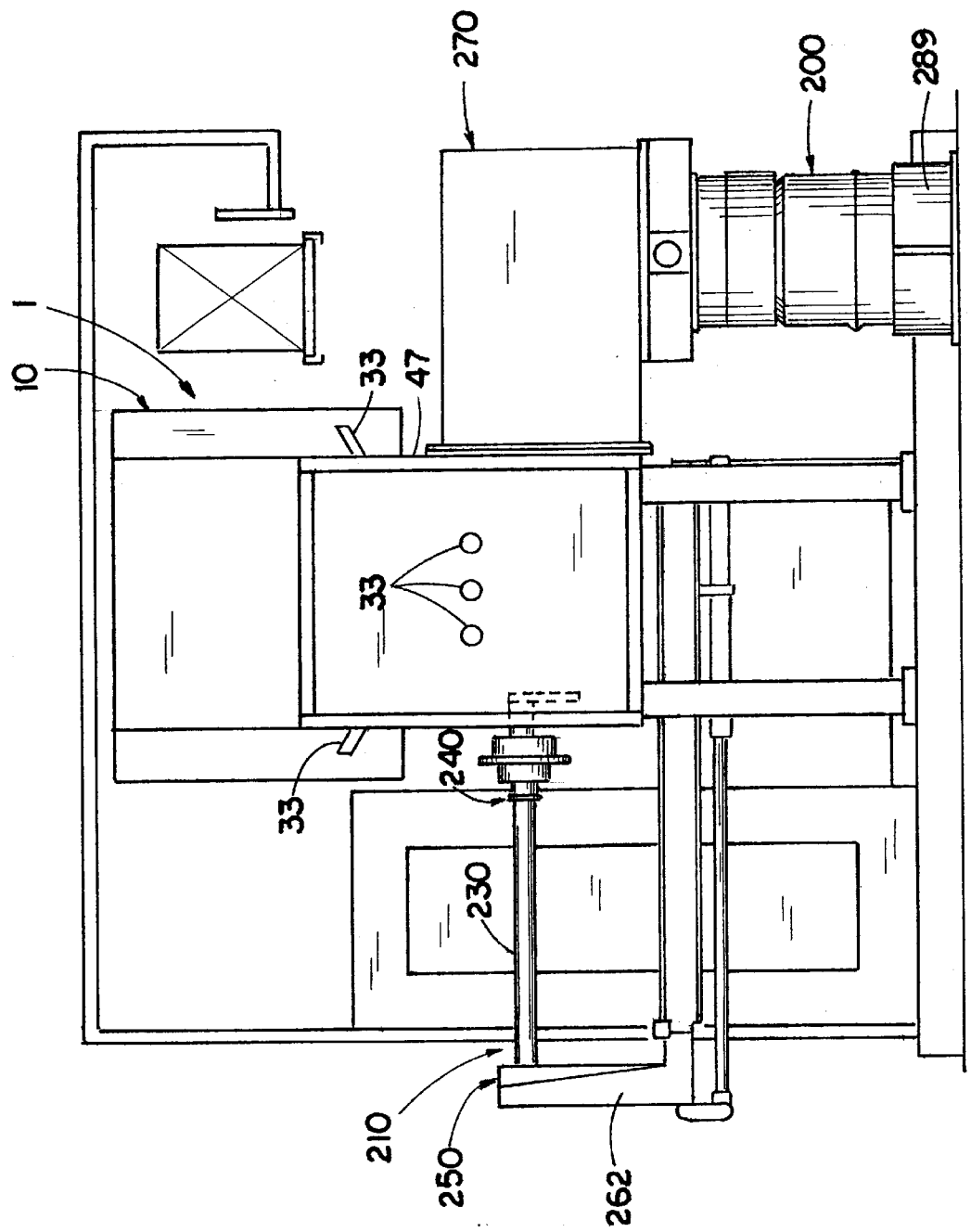
FIG. 3 is a front end elevational view of the apparatus of FIG. 1, as seen from line 3—3 in FIG. 2.
Figure 4:
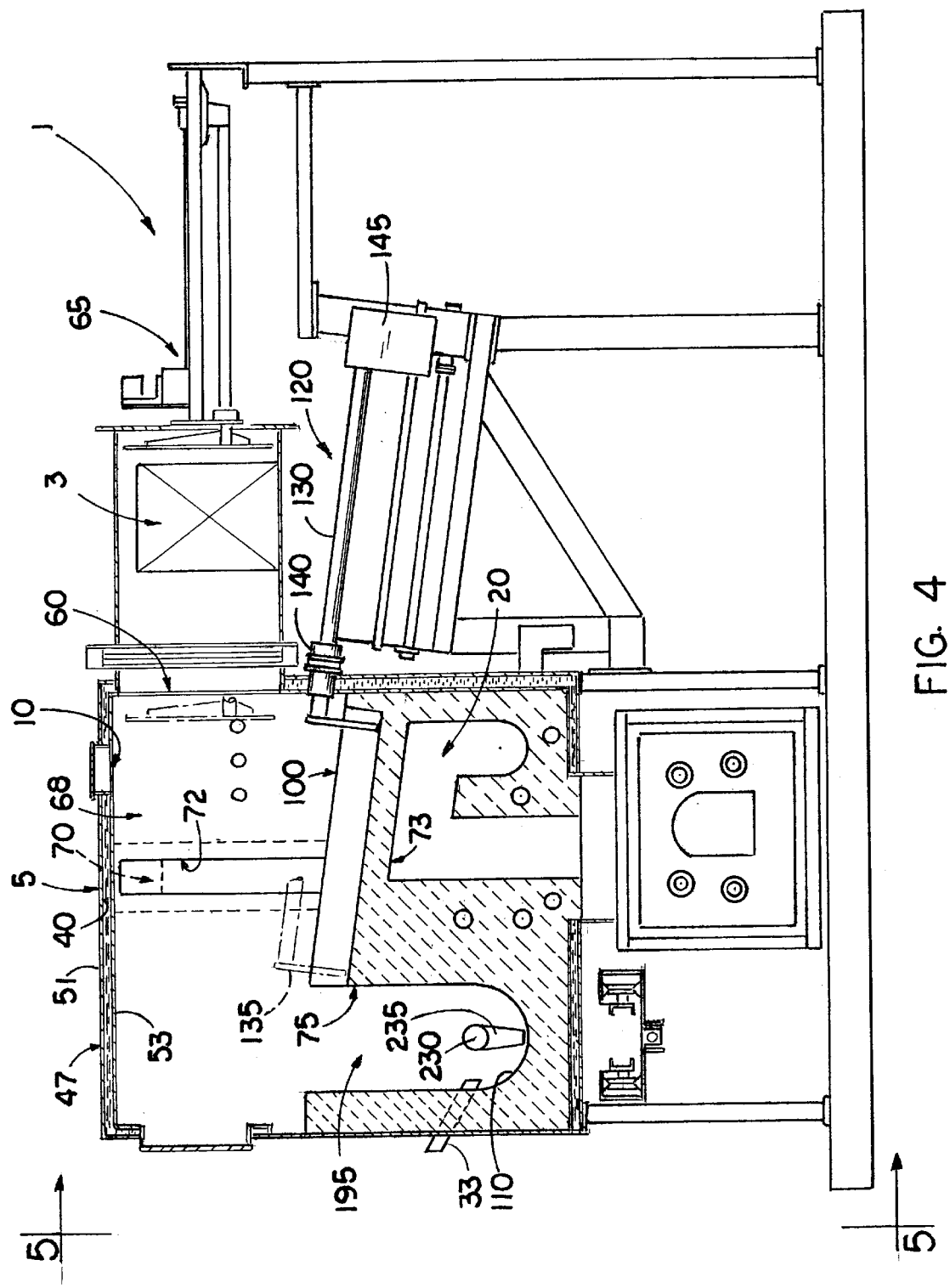
FIG. 4 is a sectional, elevational view, as taken along lines 4—4 in FIG. 2, of a first housing unit of the apparatus.

An extendable, rotatable blade assembly 210 (ERB assembly 210) is arranged to move within ash residue collection cavity 195 from a lower portion of vessel 5 (FIGS. 1–6, 8, 11–13, and 20–23). ERB assembly 210 comprises essentially the same components as ERB assembly 125. More particularly, ERB assembly 210 includes a shaft 230, a blade 235, a shaft scraper 240, and means 245 for moving shaft 230 and blade 235 within chamber 10. In addition, ERB assembly 210 includes a support frame 250 that is adapted to structurally support ERB assembly 210 on the outside of vessel 5 (FIG. 3). Frame 250 includes an upright support 255 and a horizontal support 258. ERB assembly 210 operates in the same way as ERB assembly 125 disposed on upper surface 100 of the refractory mass 75, in that ERB assembly 210 moves linearly and also rotates in accordance with a preselected library of routines. An attachment may be fitted over the end of blade 235 to increase its surface area, and allows it to conform more to the shape of bake-out trough 110 and cool-down trough 190. Further, rather than using ball screw 160, ERB assembly 210 includes a hydraulic cylinder 260 that moves shaft 230 linearly, with shaft 230 being supported on a support carriage 262. Carriage 262 has wheels 263 that ride on a track 268 to provide means for moving ERB assembly 210 linearly. ERB assembly 210 mixes and stirs ash residue in bake-out trough 110 and also moves ash residue into cool-down trough 190. As a consequence, shaft 230 and carriage support 262 are longer than ERB assembly 125 and shaft 130.

Figure 20:
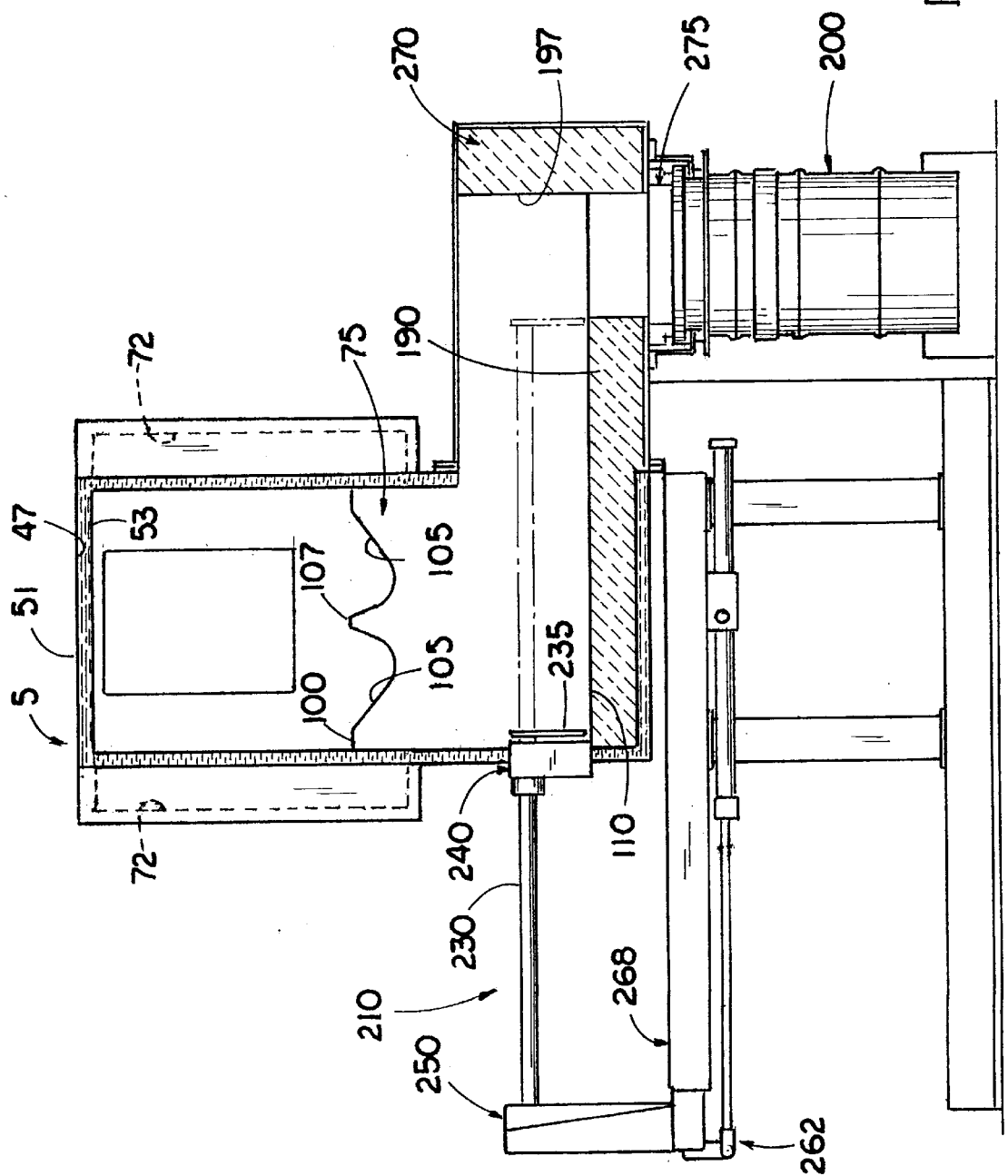
FIG. 20 is a side elevational, cross-sectional view as taken along lines 20—20 in FIG. 2.
Figure 21:
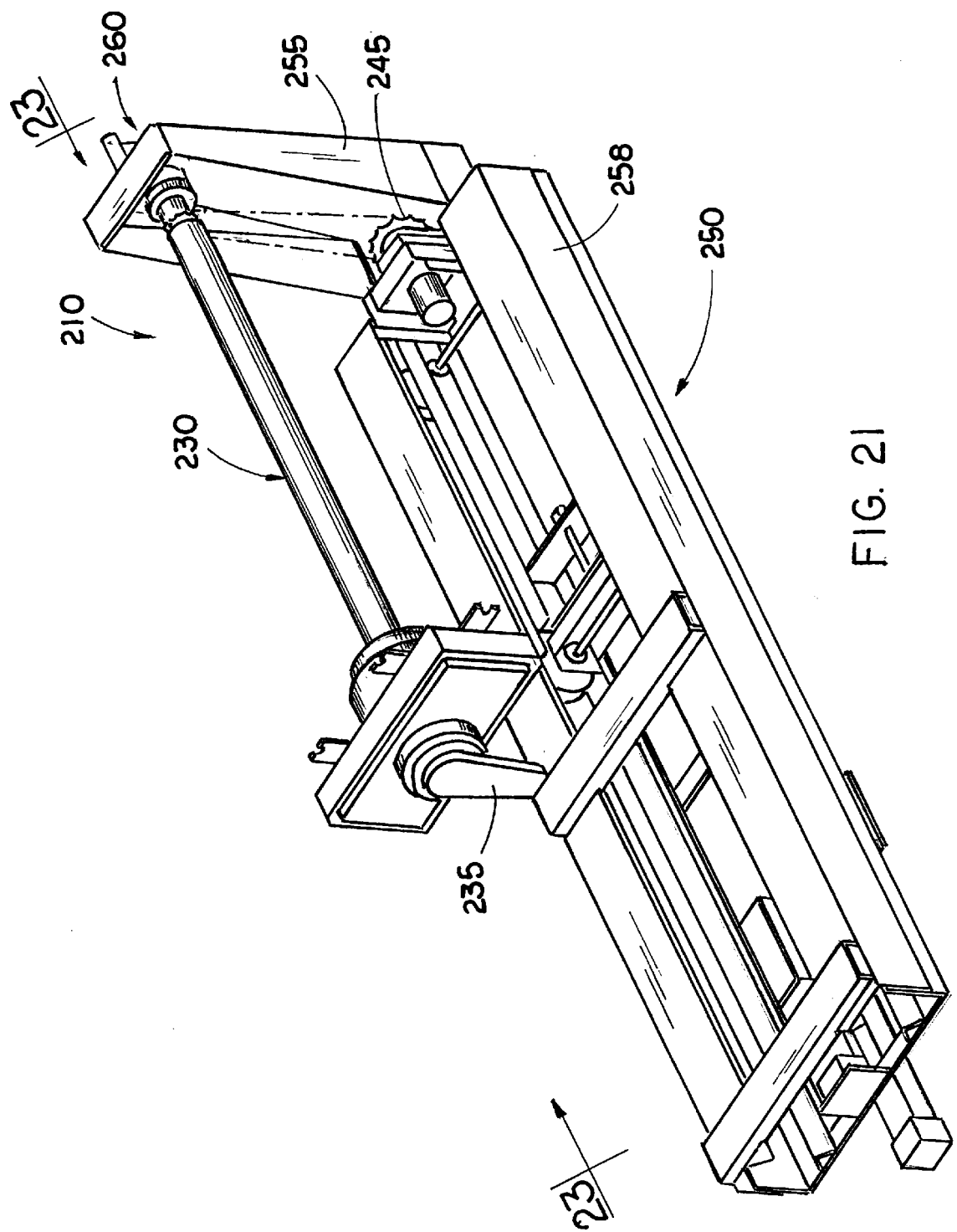
FIG. 21 is a perspective view of a support carriage and extendable, rotatable blade assembly.
Figure 22:
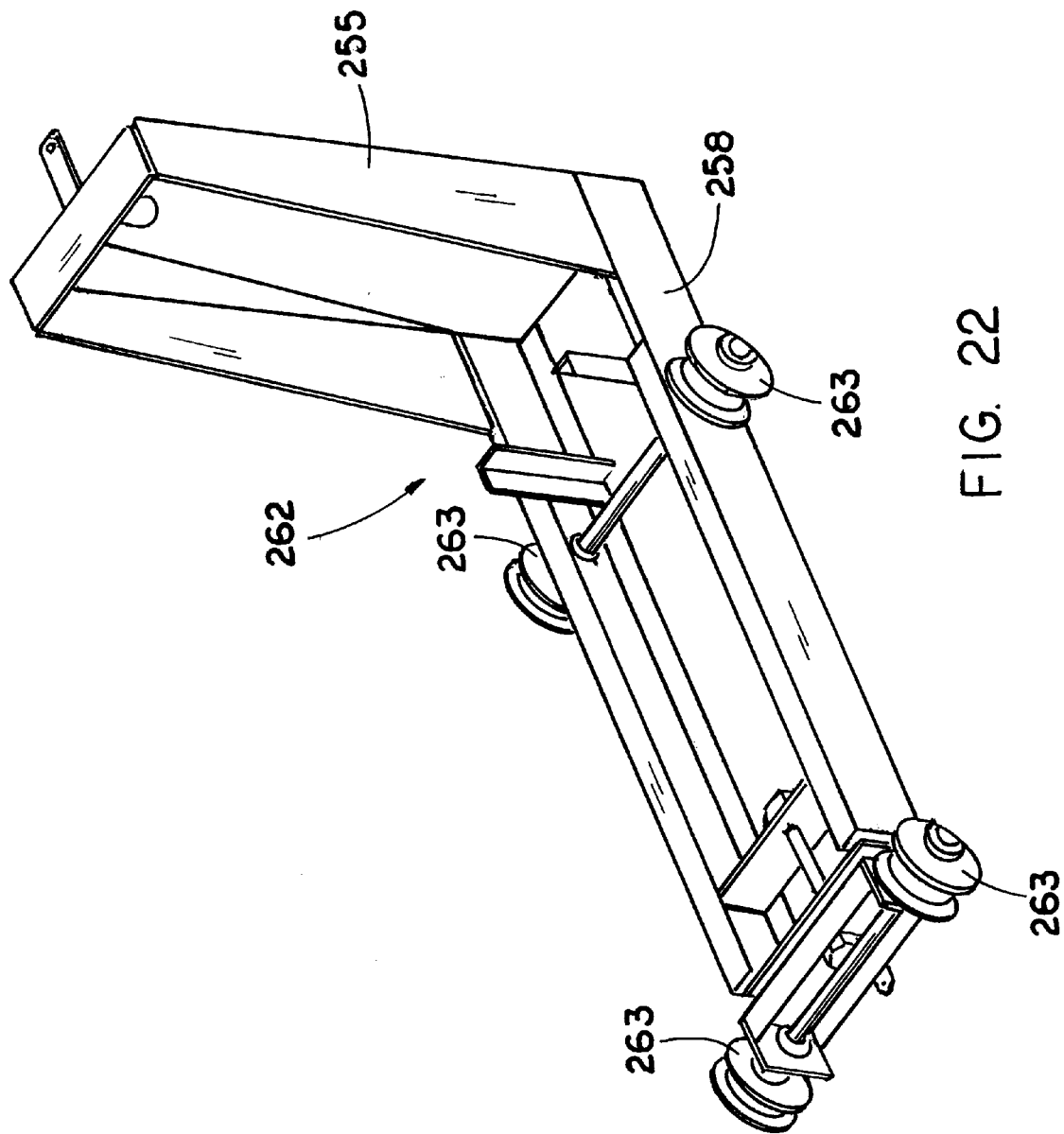
FIG. 22 is a perspective view of the support carriage shown in FIG. 20.
Figure 23:
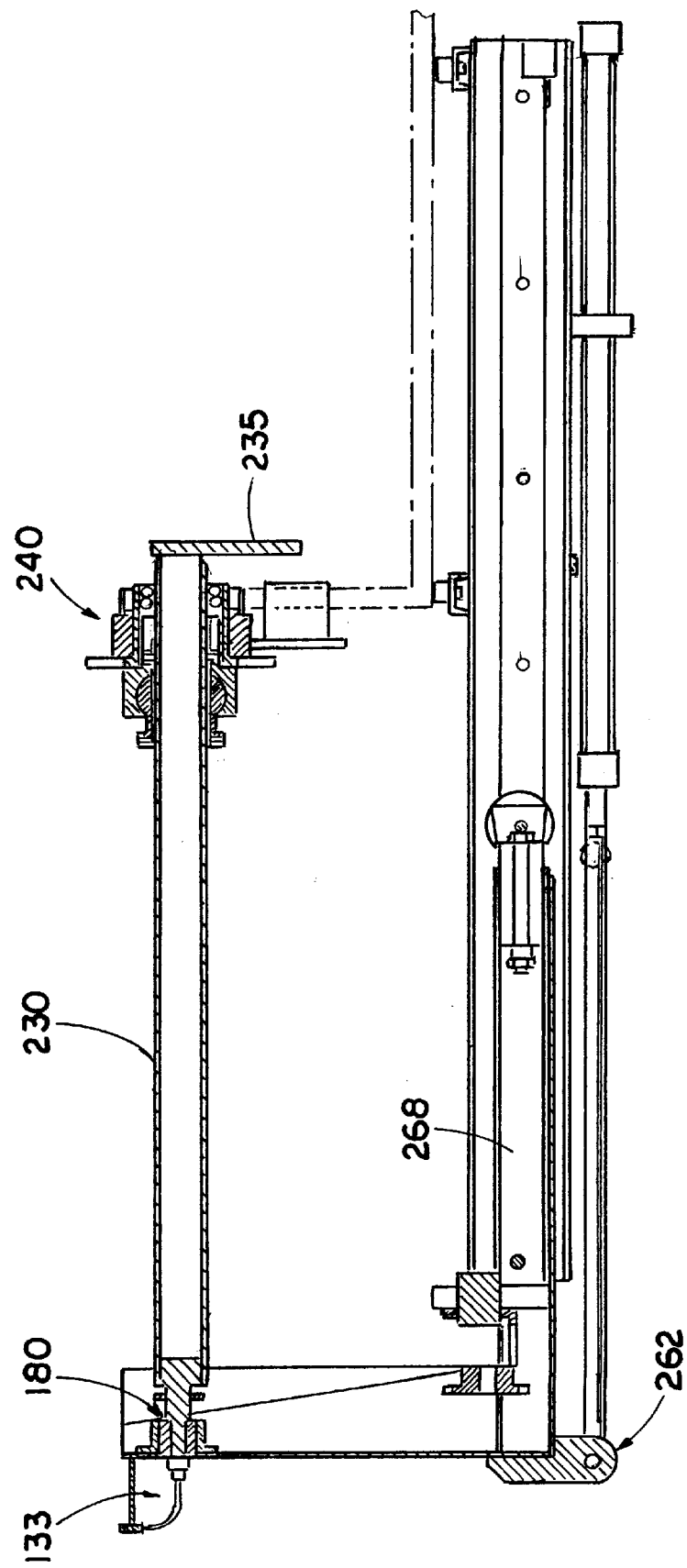
FIG. 23 is a cross-sectional view of the assembly shown in FIG. 20, as taken along lines 23—23 in FIG. 20.
Figure 24:
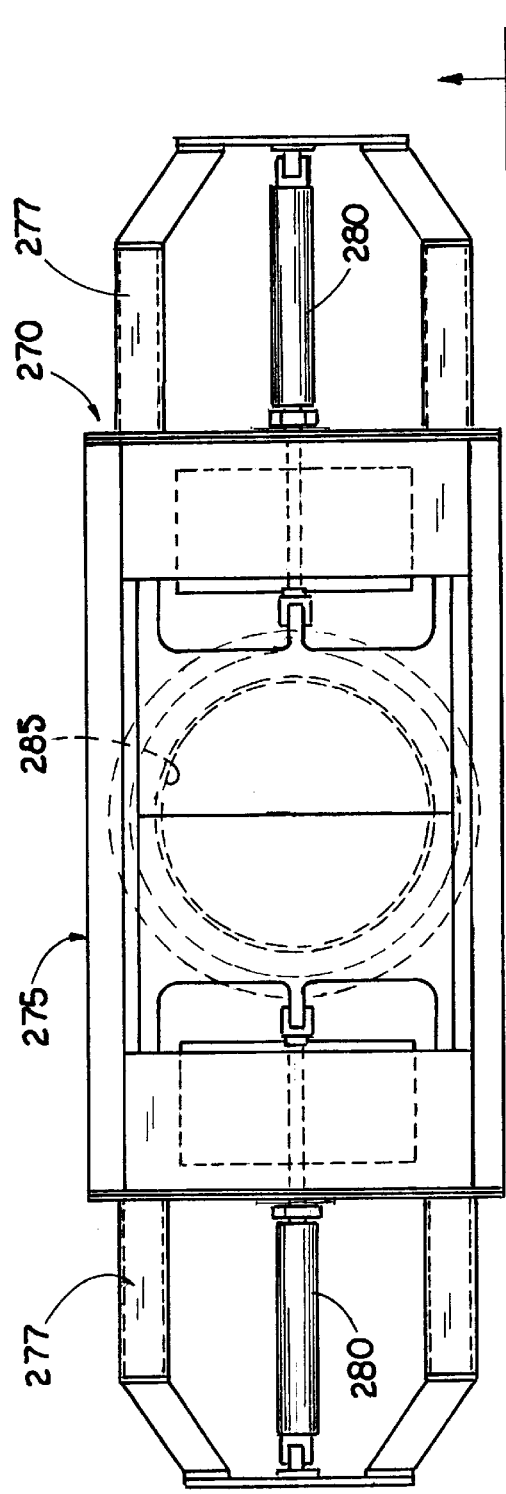
FIG. 24 is a top, cross-sectional view of the residue collection barrel assembly portion of the apparatus.
Figure 25:
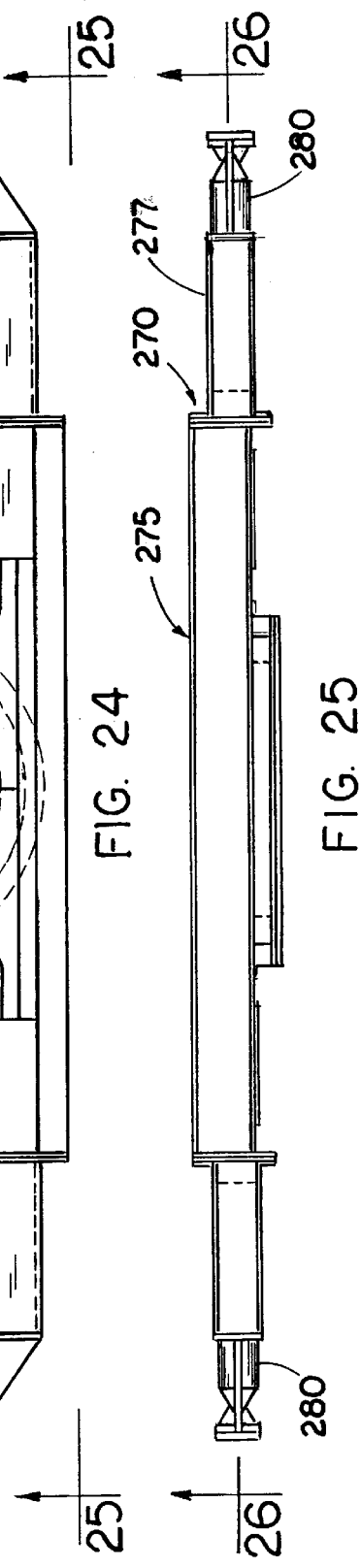
FIG. 25 is a side view as taken along lines 25—25 in FIG. 24.
Figure 26:
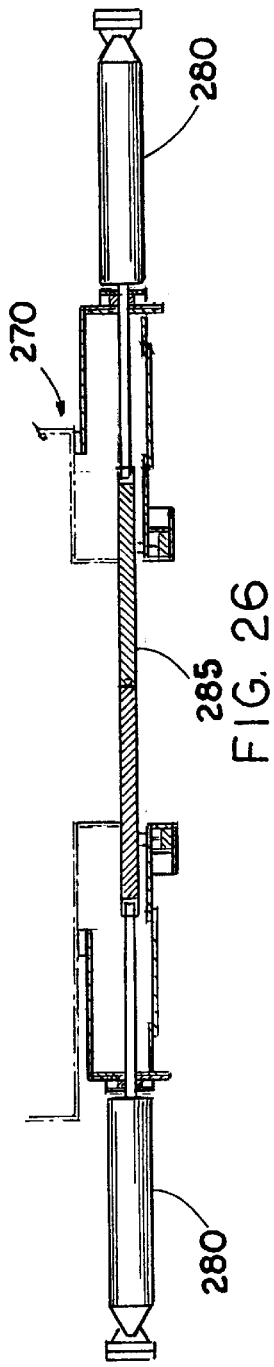
FIG. 26 is a side cross-sectional view of the residue collection barrel assembly portion of the apparatus as taken along lines 26—26 in FIG. 25.
Figure 29:
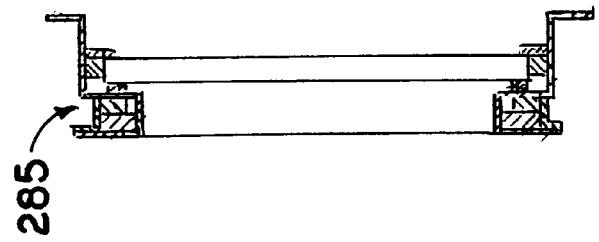
FIG. 29 is a cross-sectional view of the support frame shown in FIG. 27.
Figure 28:
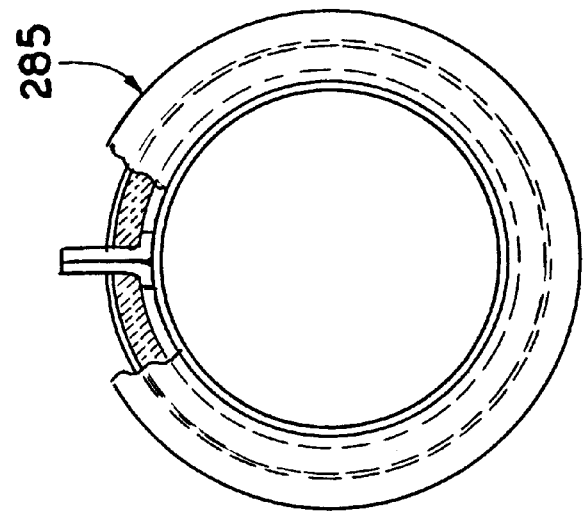
FIG. 28 is a top view of the container shown in FIG. 27.
Figure 27:
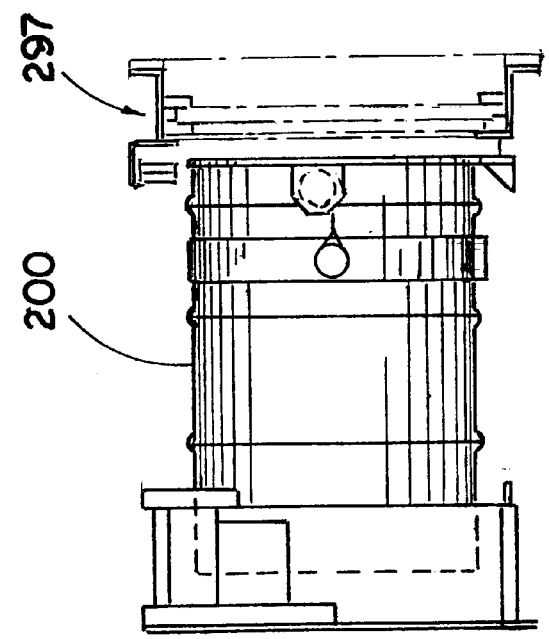
FIG. 27 is a 90° rotated, side elevational view of a residue collection container and support frame.
Figure 31:
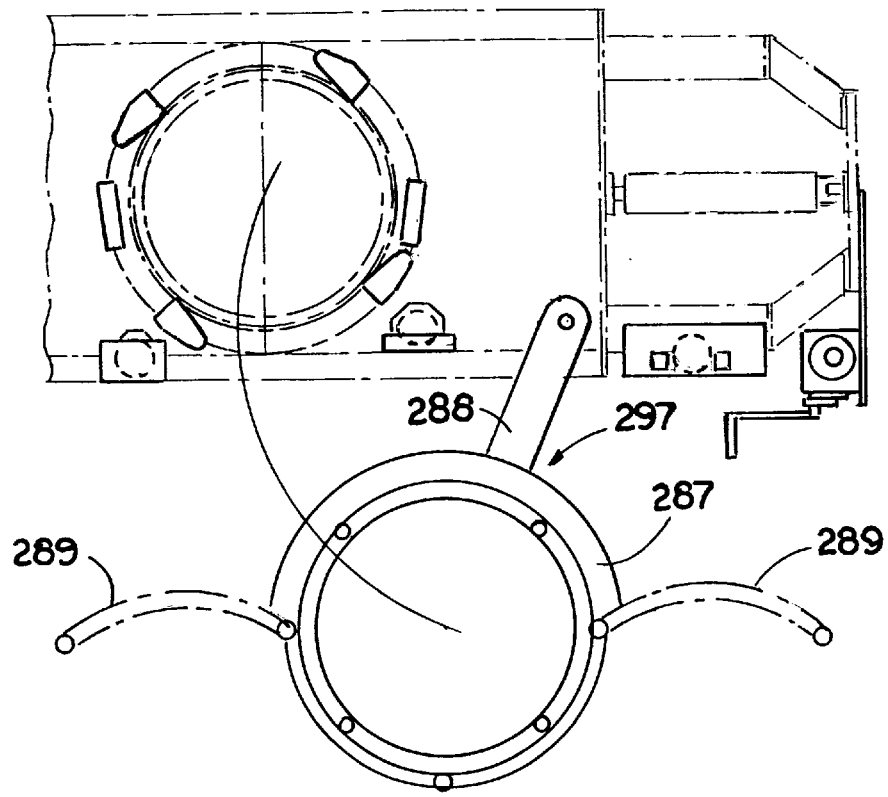
FIG. 31 is a top view of the residue collection portion of the apparatus, having the support frame rotated outwardly for removal and insertion of a container.
Figure 30:
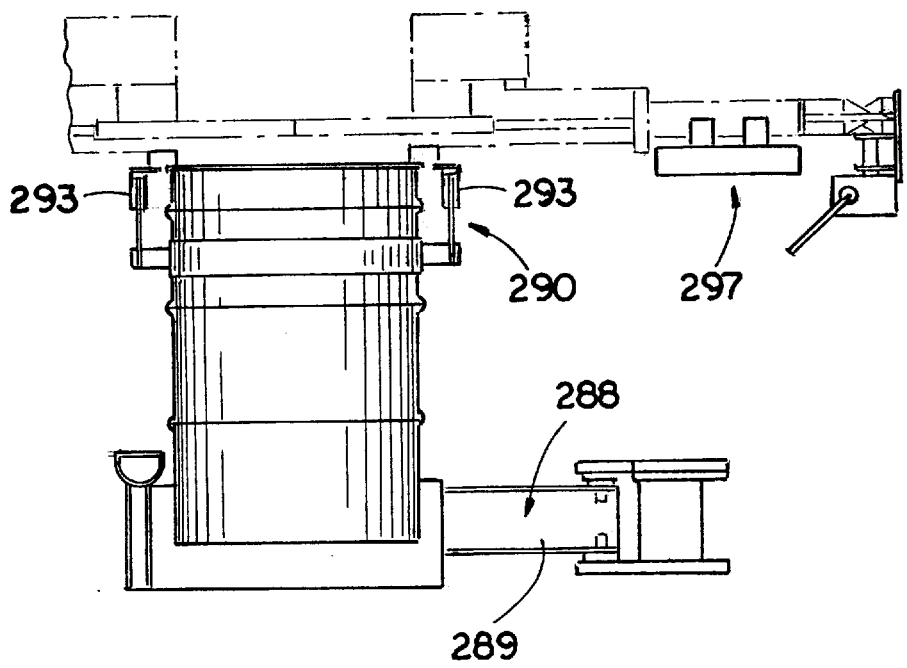
FIG. 30 is a side elevational view of the container and support frames shown in FIG. 27.

As shown in FIGS. 11 and 20, the channels forming bake-out trough 110 and cool-down trough 190 are in alignment. Cool-down trough 190 has insulation around it, and a water wall 270 adjacent to it. Disposed below opening 197, in cool-down trough 190, are a pair of slide gates 275 that run in racks 277, and are operated by hydraulic cylinders 280. Before opening gates/doors 275, barrel 200 must be brought up into contact with a seal 285 of opening 197 in order to maintain the integrity of the closed system. Barrel 200 is supported on a carriage 287 having pivotal arms 289 adapted for grasping a lower edge of barrel 200 and holding the barrel securely. Carriage 287 is mounted on a pivoting arm 288 that allows barrel 200 to pivot under or away from, opening 197. Barrel 200 is lifted off the ground and up against seal 285. This operation is completed by a cable and loop 290 that go through pulleys 293 and a crank 297 to lift barrel in place. Once barrel 200 is in correct sealed position, slide gates 275 open and barrel 200 is filled with ash. Once barrel 200 is filled, gates 275 are then closed, and barrel 200 lowered and swung out on pivoting arm 288 for removal.

Figure 32:
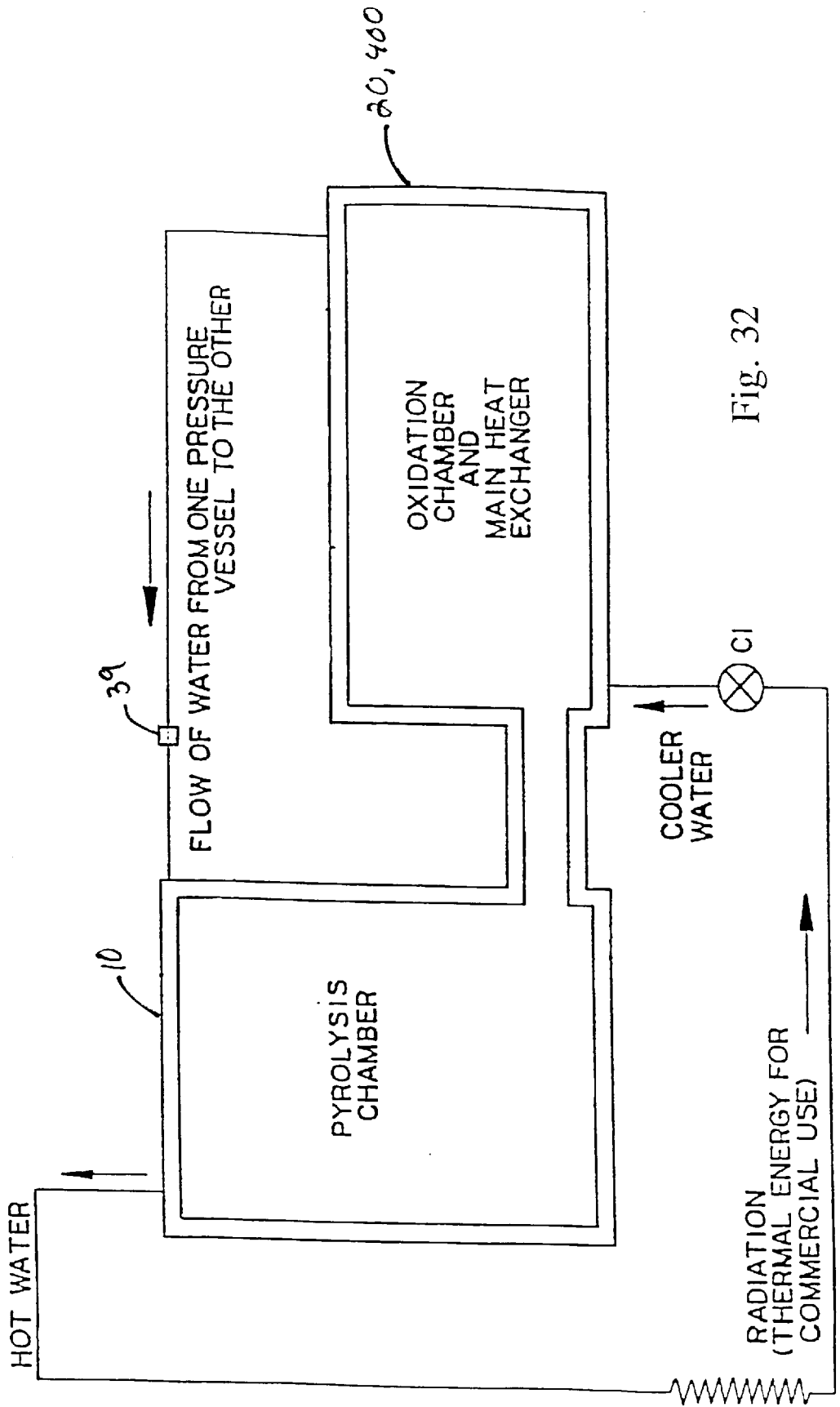
FIG. 32 is a block diagram of a coolant fluid circulation circuit employed by the apparatus.
Figure 33:
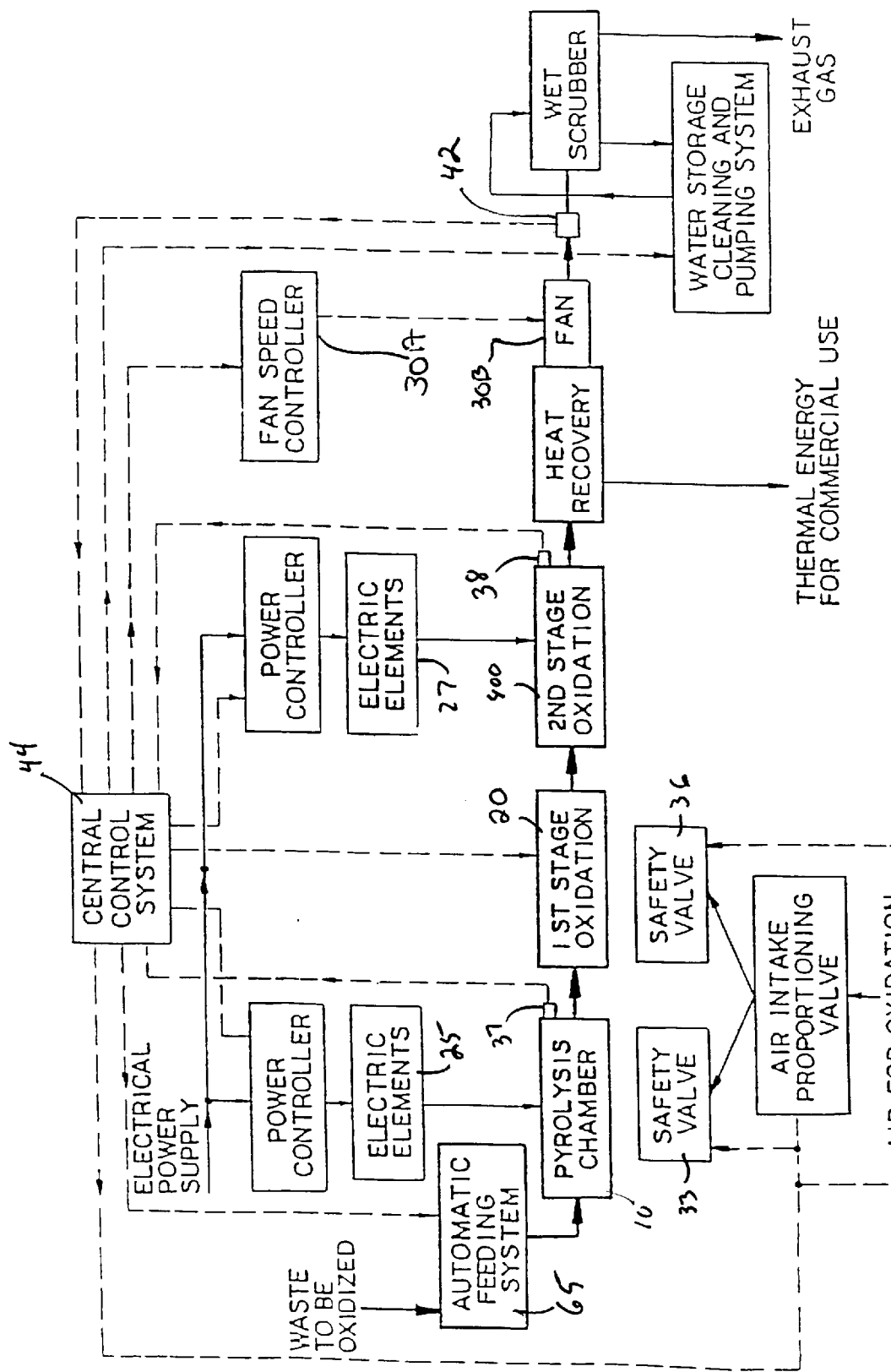
FIG. 33 is a functional block diagram of the material processing apparatus.
Figure 34:
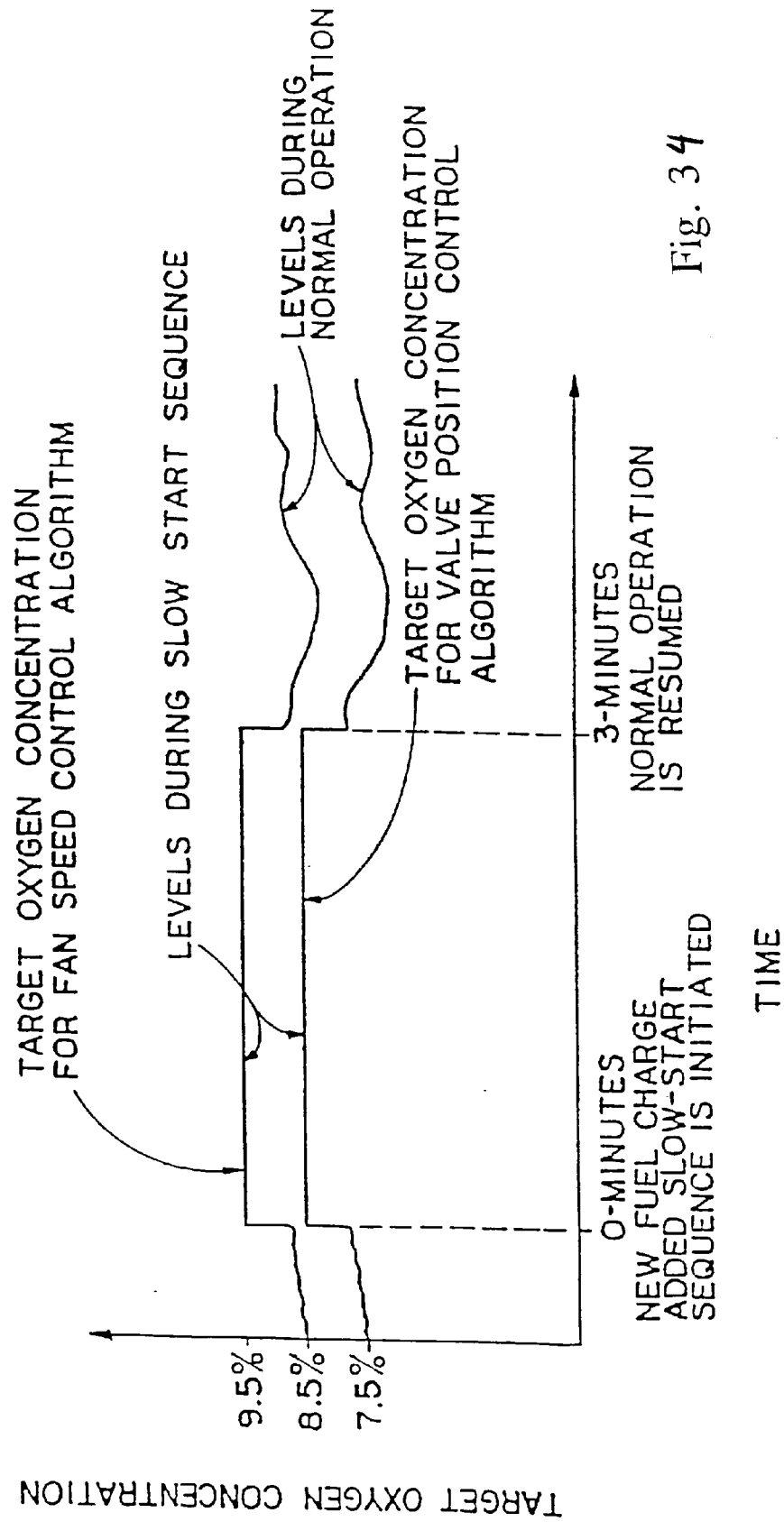
FIG. 34 is a graph of the target oxidation concentrations versus time.
Figure 35:
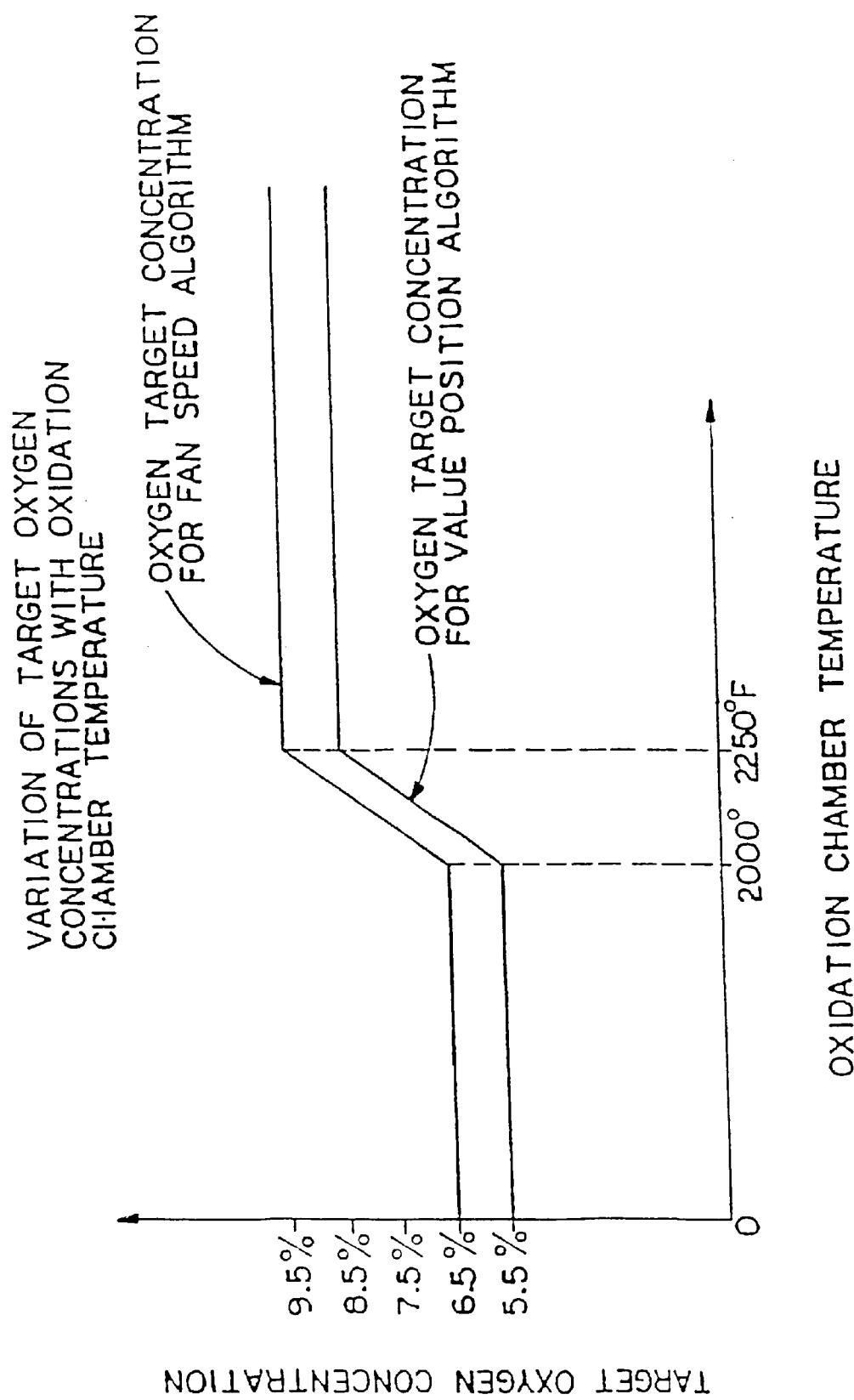
FIG. 35 is a graph of the target oxidation concentrations versus oxidation chamber temperatures.

Referring to FIGS. 32–35, there is functionally illustrated the components of and the operative steps performed by material processing apparatus 1 under the monitoring and control of computer-based central control system 44 for effecting optimal pyrolyzing and oxidizing of materials 3 therein to provide control of the hydrocarbon release rate in accordance with the present invention. FIGS. 32 and 33 provide functional block diagrams of material processing apparatus 1, illustrating the directions of interactions between the components of the apparatus to maintain the target oxygen concentration and thereby control the hydrocarbon release rate. FIGS. 34 and 35 are a graphical representation of the target oxygen concentration versus time and versus temperature, respectively.

Basically, material processing apparatus 1 operates through one cycle to thermally process, that is, to pyrolyze and oxidize, a predetermined batch of material 3, such as biomedical waste material, typically of widely varying energy values or contents. Central control system 44 functions to operate and regulate material processing apparatus 1 during each batch processing cycle by controlling the operation of the first and second heater units 25, 27, the position of the air intake proportioning valve and the speed of the induction fan 30A and 30B. Central control system 44, under control and direction of a software program stored in its internal memory repetitively, and at high speed, receives inputs, processes the inputs, and generates outputs. The inputs received by central control system 44 from the various temperature and gas sensors contain information about the current states of the pyrolysis process and of the oxidation process. Proportional, Integral, Derivative (PID) control algorithms for regulating induction fan speed 30A, proportioning valve position, and recipe/sequences for mixing and stirring means 120 and 210 are contained in the software program. These algorithms are employed by central control system 44 to process the imputed information by integrating the information into a logical sequence of decision steps and then generating an appropriate set of output instructions to ensure that the pyrolysis and oxidation processes and thus the hydrocarbon release rate continue at an optimum level.

Underlying the present invention is recognition by the inventors herein that the direct correlation or correspondence between the hydrocarbon release rate and the concentration of a preselected gas, preferably oxygen, in the discharge gases can be used to control the hydrocarbon release rate during operation of the apparatus. For the apparatus to be able to accommodate feed materials of widely varying energy contents as is needed in most waste disposal applications, and certainly with respect to biomedical waste materials, the apparatus must be operated with a hydrocarbon release rate that avoids generation and emission of unburned hydrocarbons. However, it is not possible to determine in advance the energy value or content of the batches of material which are fed into the apparatus in order to be able to adjust the operation of the apparatus to arrive at the desired hydrocarbon release rate. The inventors herein recognized that due to the direct correspondence between the oxygen concentration in the discharge gases and the hydrocarbon release rate, if only the oxygen concentration is controlled and maintained at a desired target then automatically the hydrocarbon release rate is controlled and maintained at the desired optimum level.

More particularly, if the hydrocarbon release rate begins to exceed the optimum level, this will result in the occurrence of an oxygen concentration in the discharge gases lower than the desired preset target. This deficiency will be detected by the oxygen sensor in the heat recovery exhaust and transmitted to the control system. The control system will then adjust the proportioning valve to reduce the air flow into the pyrolysis or first chamber and increase it to the primary section of the oxidation or second chamber. As less oxygen is let into the first chamber, heat generation by pyrolysis reaction in this chamber is reduced. Since the first chamber is surrounded by the coolant jacketed vessel, the surface of the waste materials therein will be cooled and thereby lower the hydrocarbon release rate to the optimum level. This effect will be further enhanced by appropriate mixing of the ash residue atop refractory mass 75 and in bake-out trough 110 according to a set of preselected recipes.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

What is claimed is:

1. A waste material processing apparatus, comprising:
    (a) a casing having a top and bottom and a plurality of sides defining a pyrolysis chamber for receiving and pyrolyzing feed materials into fluid materials, said pyrolysis chamber having an upper portion for temporarily receiving said fluid materials;
    (b) a mass of refractory material contained in said casing, spaced below said upper portion of said pyrolysis chamber and extending between said sides, said refractory mass including (i) an upper surface defining a bottom of said pyrolysis chamber, (ii) an end spaced from a first one of said sides of said casing for defining an ash residue collection cavity, (iii) a first side, (iv) a second side, and (v) a bottom; and (c) a system of tunnels defined within said refractory mass being spaced below said upper surface, said system of tunnels including (i) two inlets defined in said refractory mass, one inlet defined in said first side and one inlet defined in said second side and both arranged below said upper surface, said inlets communicating directly with said upper portion of said pyrolysis chamber so as to receive a flow of said fluid material, and (ii) an outlet defined in said bottom for discharging the flow of said fluid materials from said system of tunnels, said system of tunnels further including:

(a) a pair of spaced upper tunnels, one of said pair disposed in flow communication with said first side inlet and the other one of said pair disposed in flow communication with said second side inlet;

(b) a lower tunnel spaced below and in transverse relation to said pair of upper tunnels and positioned adjacent to an end of said refractory mass;

(c) means for interconnecting said pair of upper tunnels in flow communication with said transverse lower tunnel; and (d) a middle tunnel arranged in open flow communication with said transverse lower tunnel and said outlet.

2. Apparatus according to claim 1 wherein said pair of spaced upper tunnels are substantially parallel to one another.

3. Apparatus according to claim 1 wherein said lower tunnel is arranged substantially parallel to said ash residue collection cavity.

4. Apparatus according to claim 1 wherein means for interconnecting comprises downwardly sloping passageways communicating between said upper tunnels and said lower tunnel.

5. Apparatus according to claim 1 comprising a middle tunnel positioned between said upper tunnels, in flow communication between said lower tunnel and said outlet and defining a chamber therebetween for trapping fluid material and preventing said fluid material from flowing toward said pyrolysis chamber.

6. Apparatus according to claim 5 wherein said fluid material trapped within said chamber comprises a gas at a temperature of from about 2,000° F. to about 2,200° F.

7. Apparatus according to claim 6 wherein said fluid material within said pyrolysis chamber comprises at least one gas at a temperature of from 300° F. to 600° F.

8. A waste material processing apparatus, comprising:

(a) a casing having a top, a bottom, and a plurality of sides defining a pyrolysis chamber for receiving and pyrolyzing feed materials into fluid materials, said pyrolysis chamber including an upper portion for temporarily receiving said fluid materials and wherein at least one of said plurality of sides includes a down-draft duct having (i) an entrance positioned in flow communication with said upper portion of said pyrolysis chamber, and (ii) an exit spaced from said entrance;

(b) a mass of refractory material contained in said casing, spaced below said upper portion of said pyrolysis chamber and extending between said sides, said refractory mass including (i) an upper surface defining a bottom of said pyrolysis chamber, (ii) an end spaced from a first one of said sides of said casing for defining an ash residue collection cavity and (iii) a bottom; and (c) a system of tunnels defined within said refractory mass being spaced below said upper surface, said system of tunnels including at least one inlet defined in said refractory mass so as to receive a flow of said fluid material and communicating with said exit of said down-draft duct, and (ii) an outlet defined in said bottom for discharging said flow of said fluid materials from said system of tunnels.

9. Appparatus according to claim 8 wherein said system of tunnels provide flow communication between said pyrolysis chamber and a chamber defined within said refractory mass for trapping fluid material and preventing said fluid material from flowing toward said pyrolysis chamber.

10. Apparatus according to claim 8 comprising two down draft ducts positioned in confronting opposed relation to one another within said plurality of sides.

11. A waste material processing apparatus, comprising:

(a) a casing having a top, a bottom, and a plurality of sides defining a pyrolysis chamber for receiving and pyrolyzing feed materials into fluid materials, said pyrolysis chamber including an upper portion for temporarily receiving said fluid materials and wherein two of said plurality of sides each includes a down-draft duct having (i) an entrance positioned in flow communication with said upper portion of said pyrolysis chamber, and (ii) an exit spaced from said entrance;

(b) a mass of refractory material contained in said casing, spaced below said upper portion of said pyrolysis chamber and extending between said sides, said refractory mass including (i) an upper surface defining a bottom of said pyrolysis chamber, (ii) an end spaced from a first one of said sides of said casing for defining an ash residue collection cavity, and (iii) a bottom; and (c) a system of tunnels defined within said refractory mass being spaced below said upper surface, said system of tunnels including two inlets defined in said refractory mass so as to receive a flow of said fluid material and each communicating with an exit of one of said down-draft ducts, and (ii) an outlet defined in said bottom for discharging said flow of fluid materials from said system of tunnels, said system of tunnels further including:

(a) a pair of spaced upper tunnels, each one of said pair of upper tunnels being disposed in flow communication with one of said inlets;

(b) a lower tunnel spaced below and in transverse relation to said pair of upper tunnels and positioned adjacent to an end of said refractory mass;

(c) means for interconnecting said pair of upper tunnels in flow communication with said transverse lower tunnel; and (d) a middle tunnel arranged in open flow communication with said transverse lower tunnel and said outlet.

12. Apparatus according to claim 11 wherein said pair of spaced upper tunnels are substantially parallel to one another.

13. Apparatus according to claim 11 wherein said lower tunnel is arranged substantially parallel to said ash residue collection cavity.

14. Apparatus according to claim 11 wherein means for interconnecting comprises downwardly sloping passageways communicating between said upper tunnels and said lower tunnel.

15. Apparatus according to claim 11 comprising a middle tunnel positioned between said upper tunnels, in flow communication between said lower tunnel and said outlet and defining a chamber therebetween for trapping fluid material and preventing said fluid material from flowing toward said pyrolysis chamber.

16. Apparatus according to claim 15 wherein said fluid material trapped within said chamber comprises a gas at a temperature of from about 2,000° F. to about 2,200° F.

17. Apparatus according to claim 16 wherein said fluid material within said pyrolysis chamber comprises at least one gas at a temperature of from 300° F. to 600° F.

18. Appparatus according to claim 11 wherein said system of tunnels provide flow communication between said pyrolysis chamber and a chamber defined within said refractory mass for trapping fluid material and preventing said fluid material from flowing toward said pyrolysis chamber.

19. Apparatus according to claim 11 comprising two down draft ducts positioned in confronting opposed relation to one another within said plurality of sides.

* * * * *